(12) United States Patent
Hoshino

(10) Patent No.: US 11,627,245 B2
(45) Date of Patent: Apr. 11, 2023

(54) FOCUS ADJUSTMENT DEVICE AND FOCUS ADJUSTMENT METHOD

(71) Applicant: Olympus Corporation, Hachioji (JP)

(72) Inventor: Tomohiro Hoshino, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/687,489

(22) Filed: Mar. 4, 2022

(65) Prior Publication Data

US 2022/0294991 A1 Sep. 15, 2022

(30) Foreign Application Priority Data

Mar. 9, 2021 (JP) ............................. JP2021-037417

(51) Int. Cl.
*H04N 5/232* (2006.01)
*G03B 13/36* (2021.01)

(52) U.S. Cl.
CPC . *H04N 5/232127* (2018.08); *H04N 5/232122* (2018.08); *G03B 13/36* (2013.01)

(58) Field of Classification Search
CPC ....... H04N 5/232127; H04N 5/232122; G03B 13/36
See application file for complete search history.

(56) References Cited

U.S. PATENT DOCUMENTS

| | | | |
|---|---|---|---|
| 9,317,748 B2 * | 4/2016 | Yoneyama | H04N 5/232945 |
| 11,275,230 B2 * | 3/2022 | Sun | G06T 7/571 |
| 2009/0303342 A1 * | 12/2009 | Corcoran | G06K 9/00 348/222.1 |
| 2012/0120269 A1 * | 5/2012 | Capata | G06K 9/6257 348/222.1 |
| 2014/0226858 A1 * | 8/2014 | Kang | H04N 5/232933 382/103 |
| 2019/0045133 A1 * | 2/2019 | Tomosada | H04N 5/23219 |
| 2019/0278052 A1 * | 9/2019 | Kikuchi | G03B 15/00 |
| 2021/0158537 A1 * | 5/2021 | Funamoto | G06T 7/246 |
| 2021/0203850 A1 * | 7/2021 | Konishi | H04N 5/23258 |
| 2022/0094840 A1 * | 3/2022 | Hongu | H04N 5/232933 |

FOREIGN PATENT DOCUMENTS

JP 2014-202875 A 10/2014
JP 2019-148668 A 9/2019

* cited by examiner

*Primary Examiner* — Shahbaz Nazrul
(74) *Attorney, Agent, or Firm* — John C. Pokotylo; Pokotylo Patent Services

(57) ABSTRACT

A focus adjustment device, comprising: a processor having a main physical object position detection circuit for detecting position of a main object based on an image signal, a distance value detection circuit for detecting distance values in accordance with object distance of a plurality of AF regions based on the image signal, a candidate region setting section for setting regions exhibiting a distance value for a close-range side of greater than a specific value, with respect to a statistic for distance value of regions corresponding to position of the main physical object, to unnecessary candidate regions, and a control section for determining regions corresponding to unnecessary physical objects based on the unnecessary candidate regions, and controlling focus adjustment based on distance value corresponding to regions that have had regions corresponding to the unnecessary physical objects excluded from the main physical object regions.

20 Claims, 15 Drawing Sheets

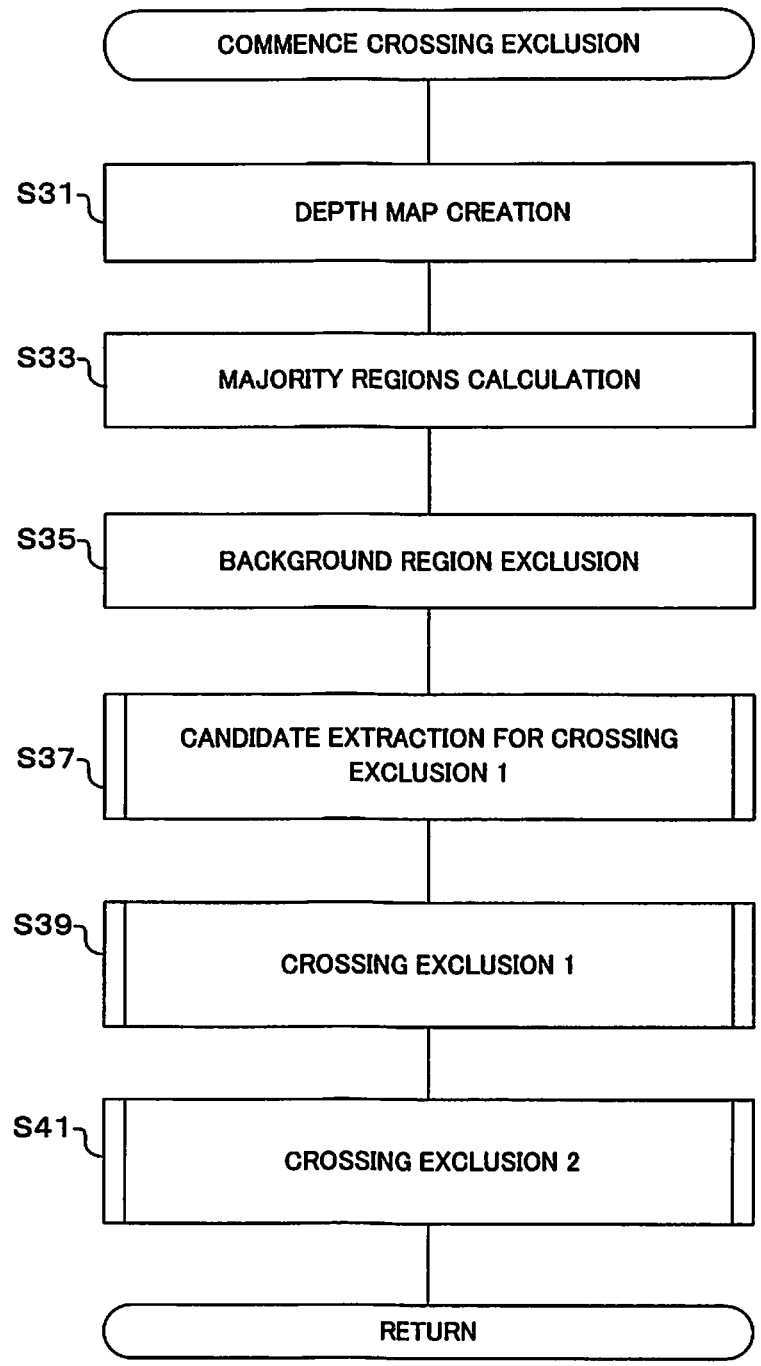

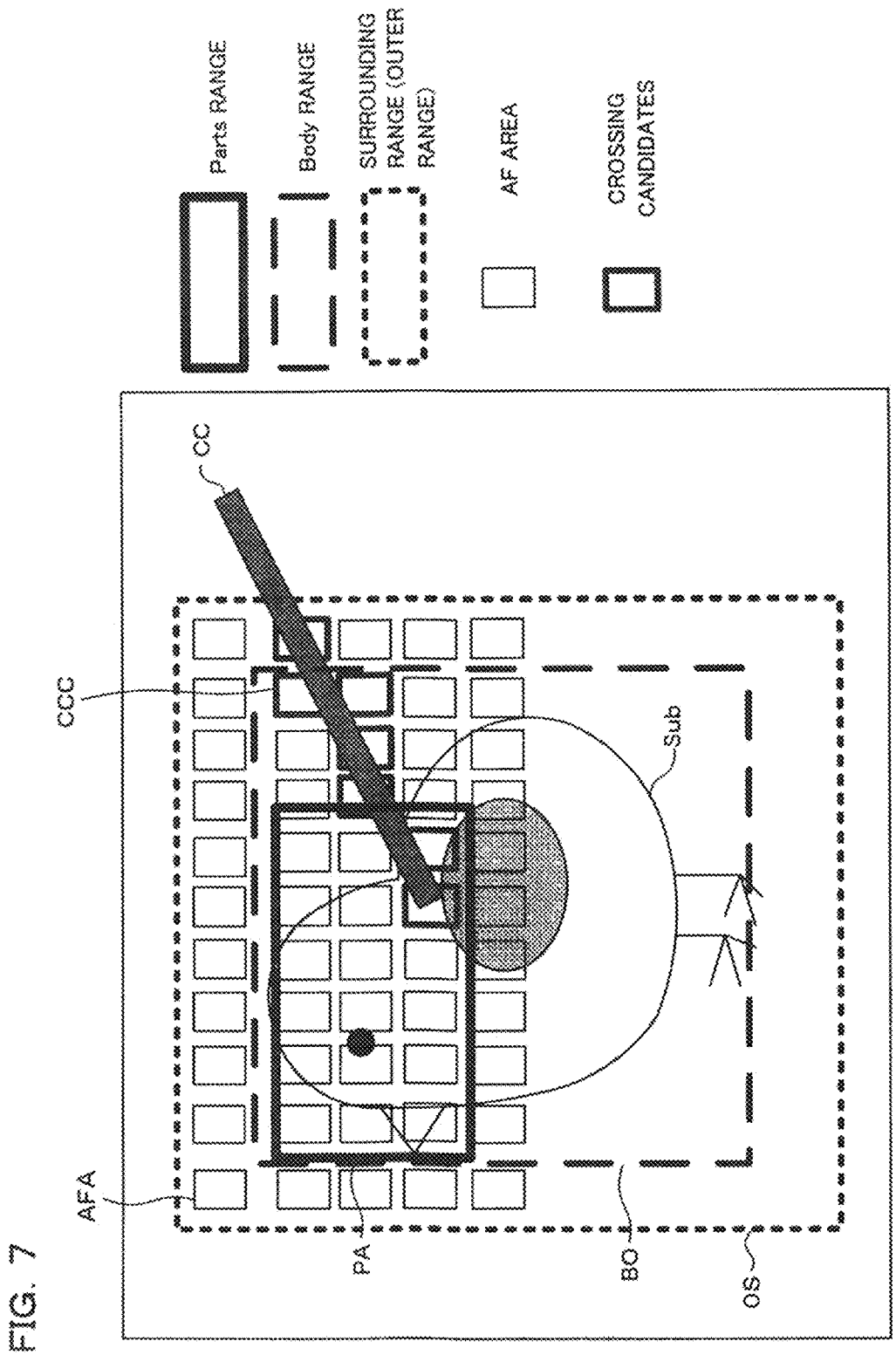

FIG. 9
TOTAL NUMBER OF Parts AREAS  30
NUMBER OF BACKGROUND AREAS  5
|  | NUMBER OF AREAS | RATIO | RATIO ORDER |
|---|---|---|---|
| Parts REGION 0 | 4 | 0.16 | 1 |
| Parts REGION 1 | 6 | 0.24 | 0 |
| Parts REGION 2 | 3 | 0.12 | 2 |
| Parts REGION 3 | ... |  |  |
| Parts REGION 4 | ... |  |  |
FIG. 10A
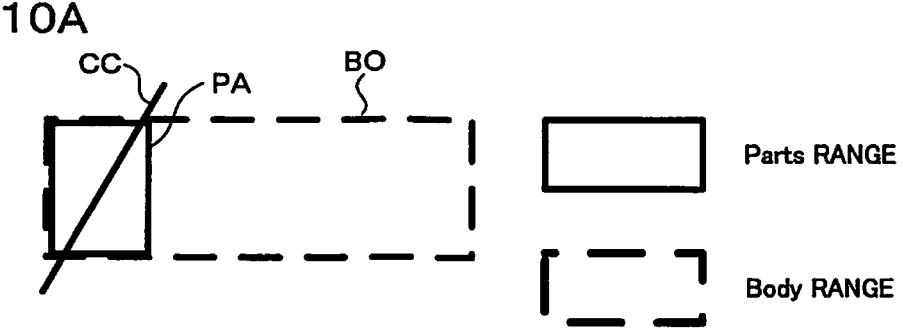
Parts RANGE
Body RANGE
FIG. 10B
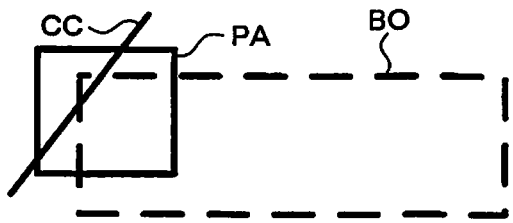
FIG. 10C
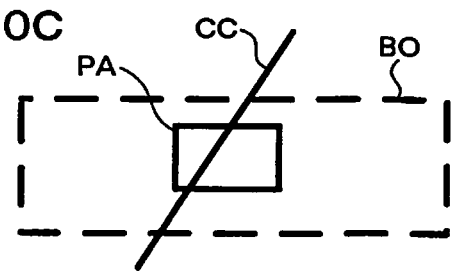

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2021-037417 filed on Mar. 9, 2021. This application is expressly incorporated herein by reference. The scope of the present invention is not limited to any requirements of the specific embodiments described in the application.

BACKGROUND OF THE INVENTION

1. Field of the Invention

The present invention relates, in a focus adjustment device and focus adjustment method that track an object, and focus on this tracked object, to detecting a main object, as well as removing unnecessary objects from subjects of focus adjustment, so as to focus on the main object.

2. Description of the Related Art

Conventionally, in devices provided with a focus detection function, there is a function to select a target for focus adjustment from among continuously taken images, and continuously track that target across continuous frames. In this type of device, it becomes possible to perform appropriate focus adjustment for tracking target objects.

In a focus detection device having a tracking function, in a case where the user wants to track many subjects, processing for tracking becomes enormous, which takes up time. There has therefore been proposed a focus detection device with which only a main object, and an object that is in front of this main object (shielding object), are made tracking targets, and a ranging point at which the main subject exists is selected at the time of in-focus (refer to Japanese laid-open patent No. 2014-202875 (hereafter referred to as "patent publication 1")). Specifically, with this focus detection device both a main subject and a shielding subject are tracked, and focus detection is performed for ranging points that are on the main subject, and that are not on the shielding subject.

With the focus detection device that is disclosed in patent publication 1 described above, in the case of a shielding object having a comparatively large area, it is possible to perform focus detection effectively. However, for example, excluding a fine crossing subject (branch) that is extremely close to the face of a bird so as to overlap the face of a bird, and tracking is difficult. That is, with the focus detection device described above, it is difficult to exclude sufficiently small physical objects (shielding objects) crossing in front of the main subject of tracking and to focus on the main subject.

SUMMARY OF THE INVENTION

The present invention provides a focus adjustment device and focus adjustment method that can focus on a main object by removing objects that are sufficiently thin to pass in front of the main object.

A focus adjustment device of a first aspect of the present invention has an image sensor that subjects light from a physical object that has passed through an optical system to photoelectric conversion to output an imaging signal, and performs focus adjustment based on the imaging signal, the focus adjustment device comprising: a main physical object position detection circuit for detecting position of a main physical object based on the image signal; a distance value detection circuit for detecting distance values corresponding to object distance for a plurality of AF regions based on the image signal; and a processor having a candidate region setting section for setting regions exhibiting a distance value for a close-range side of greater than a specific value, with respect to a statistical value for the distance values of regions corresponding to position of the main physical object, to unnecessary candidate regions, and a control section for determining regions corresponding to unnecessary physical objects based on the unnecessary candidate regions, and controlling focus adjustment based on distance value corresponding to regions that have had regions corresponding to the unnecessary physical objects excluded from the main physical object regions, wherein the candidate region setting section sets first candidate regions within regions corresponding to the main physical object region, and second candidate regions within regions corresponding to regions other than the main physical object region, and the control section determines regions corresponding to the unnecessary physical objects based on first distance values corresponding to the first candidate regions, and second distance values corresponding to the second candidate regions.

A focus adjustment method of a second aspect of the present invention is a focus adjustment method for a focus adjustment device having an image sensor that subjects light from a physical object that has passed through a photographing optical system to photoelectric conversion to output an imaging signal, and performs focus adjustment based on the imaging signal, the focus adjustment method comprising: detecting position of a main object based on the imaging signal; detecting a distance value corresponding to object distance for a plurality of AF regions based on the image signal; setting regions exhibiting a distance value for a close-range side of greater than or equal to a specified amount, with respect to a statistical value of the distance values of regions corresponding to position of the main object, to unnecessary candidate regions; discriminating regions corresponding to unnecessary physical objects based on the unnecessary candidate regions; controlling focus adjustment based on distance values corresponding to regions resulting from having excluded regions corresponding to the unnecessary physical objects from the main physical object region; further, setting first candidate regions within regions corresponding to the main physical object region, and second candidate regions within regions corresponding to regions other than the main physical object region; and determining regions corresponding to the unnecessary physical objects based on first distance values corresponding to the first candidate regions, and second distance values corresponding to the second candidate regions.

A non-transitory computer-readable medium of a third aspect of the present invention, storing a processor executable code, which when executed by at least one processor, the processor being arranged within a focus adjustment device that has an image sensor that subjects light from a physical object that has passed through a photographing optical system to photoelectric conversion to output an image signal, and performs focus adjustment based on the image signal, performs a focus adjustment method, the focus adjustment method comprising: detecting position of a main object based on the imaging signal; detecting a distance value corresponding to object distance for a plurality of AF regions based on the image signal; setting regions exhibiting a distance value for a close-range side of greater than or equal to a specified amount, with respect to a statistical value of the distance values of regions corresponding to position of the main object, to unnecessary candidate regions; determining regions corresponding to unnecessary physical objects based on the unnecessary candidate regions; controlling focus adjustment based on distance values corresponding to regions resulting from having excluded regions corresponding to the unnecessary physical objects from the main physical object region; further, setting first candidate regions within regions corresponding to the main physical object region, and second candidate regions within regions corresponding to regions other than the main physical object region; and determining regions corresponding to the unnecessary physical objects based on first distance values corresponding to the first candidate regions, and second distance values corresponding to the second candidate regions.

BRIEF DESCRIPTION OF THE DRAWINGS

FIG. 2 is a flowchart showing main operation when a power supply of the imaging device of one embodiment of the present invention has been turned on.

FIG. 3 is a flowchart showing crossing exclusion operation of an imaging device of one embodiment of the present invention.

FIG. 7 is a drawing showing separation of subject detection ranges, in the imaging device of one embodiment of the present invention.

FIG. 9 is a table for describing one example of ratios of parts regions, in the imaging device of one embodiment of the present invention.

FIG. 10A to FIG. 10C are drawings showing positional relationships of body ranges, parts ranges, and crossing subjects, in the imaging device of one embodiment of the present invention.

DETAILED DESCRIPTION OF THE PREFERRED EMBODIMENTS

Figure 1:
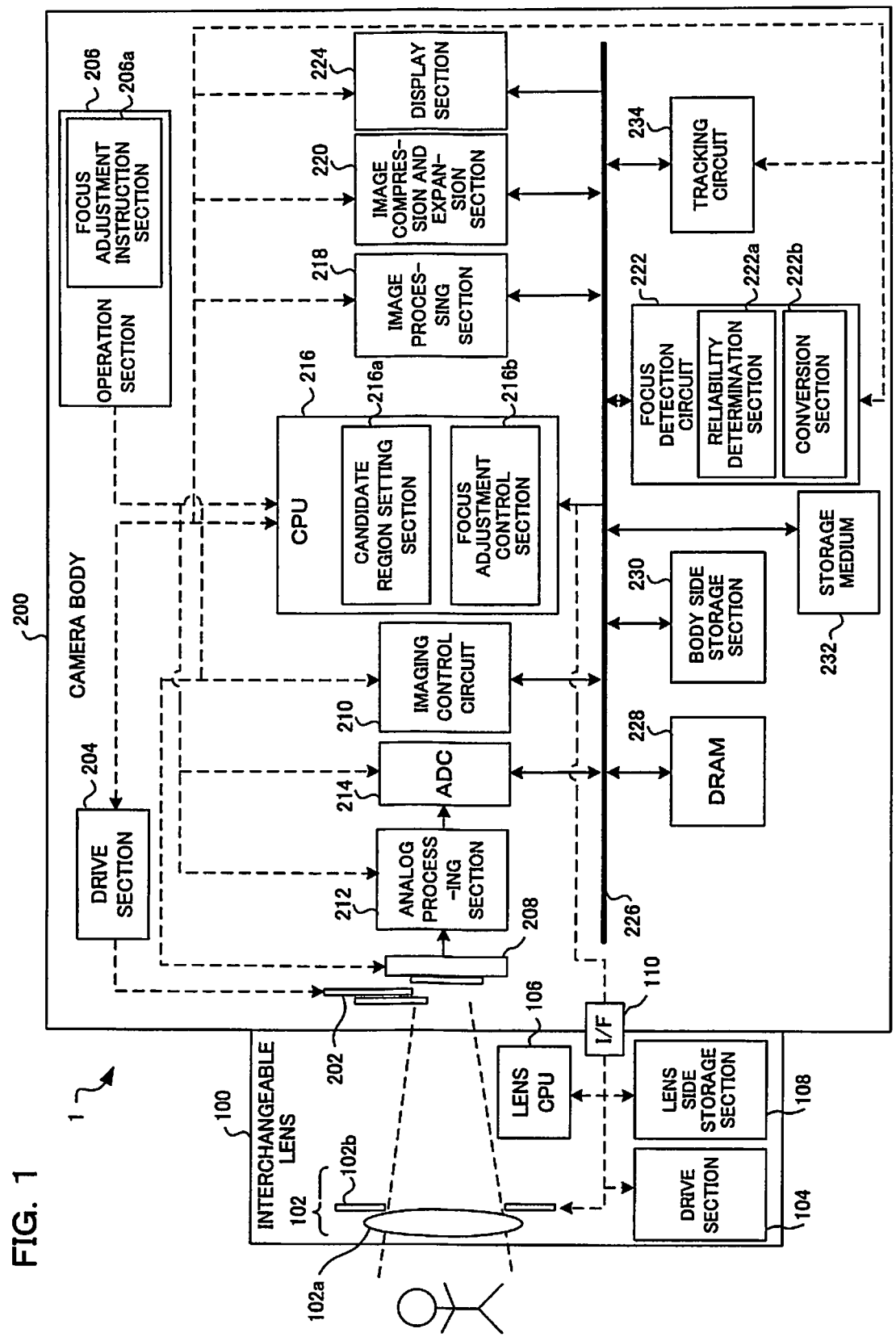
FIG. 1 is a block diagram mainly showing the electrical structure of an imaging device of one embodiment of the present invention.

In the following, description will be given of an example where the present invention has been applied to an imaging device, as one embodiment of an imaging device of the present invention. This imaging device is a digital camera, and has an imaging section, with a subject image (object image) being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Also, image data that has been stored in the storage medium can be subjected to playback display on the display section if playback mode is selected.

The focus adjustment device of the imaging device of this embodiment has an image sensor that subjects light from a physical object that passed through a photographing optical system to photoelectric conversion to output an image signal, and performs focus adjustment based on this image signal. Also, this focus adjustment device has an image sensor that repeatedly performs imaging of subject light that has passed through a photographing optical system at a specified frame rate and outputs an image signal, and performs focus adjustment based on this image signal.

Also, the imaging device of this embodiment has a tracking function for tracking a subject, this tracking function can detect bodies (entire bodies) and parts (for example, faces, heads etc.) of people and animals, and it is possible to track bodies and parts that have been detected, A main subject (main physical object) is tracked using this tracking function, and the main subject is focused on (focus adjustment is performed) based on focus detection signals from ranging (AF) areas that contain the main subject.

Also, in a case where a plurality of subjects exist within an AF area, a close-up end subject is generally focused on. This means that when taking pictures of wild birds, even in cases where the face of a bird has been detected, if there is a thin subject crossing the face (for example, a branch) (hereafter referred to as a "crossing subject") it is difficult to exclude thin crossing subjects and achieve focus on the face of the bird.

With this embodiment therefore, the control section of the imaging device acquires information on subject range from a tracking block. Also, a ranging section has a plurality of AF areas, and defocus amount is detected in each AF area. The control section generates a depth map by converting defocus amount to lens position LDP (Lens Defocus Pulse) corresponding to distance, in respective regions of a body range and an outer range. If a depth map is created, the control section extracts regions, made up of close-up end AF areas that have average LDP that is greater, by a predetermined value or more, than average LDP within a body range, as "crossing candidates". Next, the control section compares average LDP of "crossing candidates" that are respectively located in a body range and an outer range, and excludes "crossing candidates" that are within a specified range, and that have a small area, as "crossing subjects". The control section executes focus adjustment using lens position LDP (or defocus amount) of AF areas that have not been excluded and remain, within a body range.

FIG. 1 is a block diagram showing one example of the structure of an imaging device (specifically, a digital camera, for example) that includes a focus adjustment device of one embodiment of the present invention. As will be described later, the focus adjustment device of the present invention is not limited to a digital camera, and in this embodiment the present invention is applied to an imaging device. It should be noted that in FIG. 1 solid line arrows show flow of data, and dashed line arrows show flow of control signals, respectively.

An imaging device 1 comprises an interchangeable lens 100 and a camera body 200. The interchangeable lens 100 is configured so that it is possible to attach to the camera body 200. When the interchangeable lens 100 is attached to the camera body 200, the interchangeable lens 100 and the camera body 200 are connected so that communication is possible between them by means of an I/F 110. It should be noted that the imaging device 1 is not necessarily a lens interchangeable imaging device. For example, the imaging device 1 may be a lens integrated imaging device. The imaging device may also be provided within a portable device, such as a smartphone.

The interchangeable lens 100 comprises an imaging optical system 102, a drive section 104, a lens CPU (Central Processing Unit) 106, and a lens side storage section 108. Here, each block of the interchangeable lens 100 is configured using hardware, for example. However, the configuration does not necessarily have to use hardware, and some sections may be configured using software. Also, each block of the interchangeable lens 100 need not be configured using a single hardware or software component, and may be configured using a plurality of hardware or software components. Also, in a case where the interchangeable lens and the camera body are integrated, the lens CPU 106 and the CPU 216 may be configured as a single CPU.

The imaging optical system 102 is an optical system imaging light flux from a subject on to the image sensor 208 of the camera body 200. The imaging optical system 102 comprises a focus lens 102a and an aperture 102b. The focus lens 102a is constructed so as to be able to adjust focal position of the imaging optical system 102 by moving in an optical axis direction.

The aperture 102b is arranged on the optical axis of the focus lens 102a. The opening diameter of the aperture 102b is variable. The aperture 102b adjusts amount of light from a subject passing through the focus lens 102a that is incident on the image sensor 208. The drive section 104 has a drive motor and a drive circuit etc., and drives the focus lens 102a and the aperture 102b based on control signals output from the lens CPU 106. Here, the imaging optical system 102 may be configured as a zoom lens. In this case, the drive section 104 may also perform zoom drive, and focal length may also be changed by manual operation of the user. The lens CPU 106 acquires focal length information from the drive section 104, and transmits this information to the CPU 216. The drive section 104 functions as an aperture drive section (actuator, driver) for driving the aperture that is included in the imaging optical system.

The lens CPU 106 is a processor that includes a CPU and peripheral circuits for the CPU, and operates in accordance with programs stored in a lens side storage section 108. The lens CPU 106 is configured so as to be able to communicate with the CPU 216 of the camera body 200 via an interface (I/F) 110. The lens CPU 106 controls the drive section 104 in accordance with control signals from the CPU 216 of the camera body 200. Also, the lens CPU 106 transmits various information, such as aperture value (F value) of the aperture 102b, and lens information etc. stored in the lens side storage section 108, to the CPU 216 via the I/F 110. The lens CPU 106 functions as a focus lens control section (processor) that controls position of the focus lens contained in the imaging optical system 102a.

It should be noted that the lens CPU 106 is not necessarily configured as a CPU. That is, functions that are the same as those of the lens CPU 106 may also be implemented using a processor such as an ASIC (Application Specific Integrated Circuit) or FPGA (Field-Programmable Gate Array) etc. Also, functions that are the same as those of the lens CPU 106 may also be implemented using software.

The lens side storage section 108 is an electrically rewritable nonvolatile memory, and stores lens information etc. relating to the interchangeable lens 100, as well as the above described programs. Lens information includes, for example, focal length information and aberration information of the imaging optical system 102.

The camera body 200 comprises a mechanical shutter 202, a drive section 204, an operation section 206, the image sensor 208, an imaging control circuit 210, an analog processing section 212, an analog to digital converter (hereafter referred to as ADC) 214, the CPU 216, an image processing section 218, an image compression and expansion section 220, a focus detection circuit 222, a display section 224, a bus 226, DRAM (Dynamic Random Access Memory) 228, a body side storage section 230, a storage medium 232, and a tracking circuit 234. Here, each block of the camera body 200 is configured using hardware, for example. However, the configuration does not necessarily have to use hardware, and some sections may be configured using software. Also, each block of the camera body 200 need not be configured using a single hardware or software component, and may be configured using a plurality of hardware or software components.

The mechanical shutter 202 has an opening and closing structure, and adjusts a time for which light flux from the subject is incident on the image sensor 208 (exposure time of the image sensor 208). A focal plane shutter, for example, is adopted as the mechanical shutter 202. Besides this focal plane shutter, a lens shutter may be provided at the lens barrel side. The drive section 204 drives the mechanical shutter 202 based on control signals from the CPU 216. The drive section 204 comprises an actuator that drives the mechanical shutter 202, and drive circuitry etc. for this actuator, and performs opening and closing operations of the mechanical shutter 202.

The operation section 206 is an interface for input of user instruction to the imaging device 1, and comprises a focus adjustment instruction section 206a, and other operation members. As these other operation members there are various operation members such as various operating buttons such as a power supply button, release button, movie button, mode dial, playback button, menu button etc., and a touch panel. The focus adjustment instruction section 206a may be provided with a single operation member for focus adjustment instruction (and may also be a touch panel), but in this embodiment focus adjustment instruction is issued using a half press operation of the release button. It should be noted that a 1st release switch is turned on as a result of a half press operation of the release button, and a 2nd release switch is turned on as a result of a full press operation of the release button. The operation section 206 detects operating state of the various operation members, and outputs signals representing detection results to the CPU 216.

The image sensor 208 is arranged on the optical axis of the imaging optical system 102, at a position that is behind the mechanical shutter 202, and where light flux from a subject is formed into an image by the imaging optical system 102. The image sensor 208 images a subject and generates a pixel signal relating to the subject.

The image sensor 208 has a pixel section 22 (refer to FIG. 2) with a plurality of imaging pixels arranged two-dimensionally. Imaging pixels are constructed divided into a plurality of phase difference detection pixels, corresponding to each micro lens. The phase difference detection pixels generate photoelectric conversion signals by respectively subjecting light flux, that passes through regions resulting from subjecting a plurality of exit pupils of an imaging optical system 102 to pupil-division, to photoelectric conversion. While the image sensor 208 is constructed as a single CMOS image sensor provided with a primary color Bayer array color filter, this structure is not limiting.

The imaging control circuit 210 performs exposure control (charge accumulation control) and charge readout control for each pixel of the image sensor 208. These controls are performed in accordance with settings of a pixel signal readout method from the CPU 216.

The analog processing section 212 has an analog processing circuit, and inputs pixel signals that have been read out from the image sensor 208, in accordance with control by the imaging control circuit 210. The analog processing section 212 performs amplification processing etc. on the pixel signals. The analog processing section 212 outputs the pixel signal after processing to the ADC 214. The ADC 214 converts a pixel signal that has been output from the analog processing section 212 to pixel data in a digital format, and outputs the pixel data to the bus 226. It should be noted that in the description that follows a collection of pixel data is called image data.

The CPU 216 is a processor that includes a CPU and peripheral circuits for the CPU, and performs overall control of the camera body 200 in accordance with programs stored in a body side storage section 230. If tracking results for a main subject are input from the tracking circuit 234, the CPU 216 outputs control signals for driving the focus lens 102a, based on phase difference detection signals from AF areas in which this main subject is contained, to the lens CPU 106. Here, the CPU 216 is not necessarily configured as a CPU. Specifically, functions that are the same as those of the CPU 216 may also be implemented using an ASIC or FPGA etc. Also, functions that are the same as those of the CPU 216 may also be implemented using software.

The CPU 216 has a candidate region setting section 216a, and a focus adjustment control section 216b. Functions of the candidate region setting section 216a and the control section 216b may be realized by respective hardware circuits etc., but in this embodiment these functions are realized by the CPU 216 based on programs stored in the body side storage section 230. The CPU 216 functions as a processor having a candidate region setting section and a control section.

The candidate region setting section 216a sets AF areas and regions that are not considered at the time of focus adjustment. In this embodiment, the candidate region setting section 216a sets non main physical objects that are at positions such that they cross in front or the like of the main physical object (main subject), as unnecessary regions (refer, for example, to S17 in FIG. 2, S37 in FIG. 3, and to FIG. 4A to FIG. 4C). For example, in FIG. 7, a distance value (LDP) is calculated based on defocus amount for each AF area AFA (S15 in FIG. 2), regions (made up of AF areas) are detected based on this distance value (S33 in FIG. 3), and crossing candidates CCC (made up of AF areas) in which there is a possibility that a crossing subject CC exists are determined based on the distance values of each region.

Figure 2:
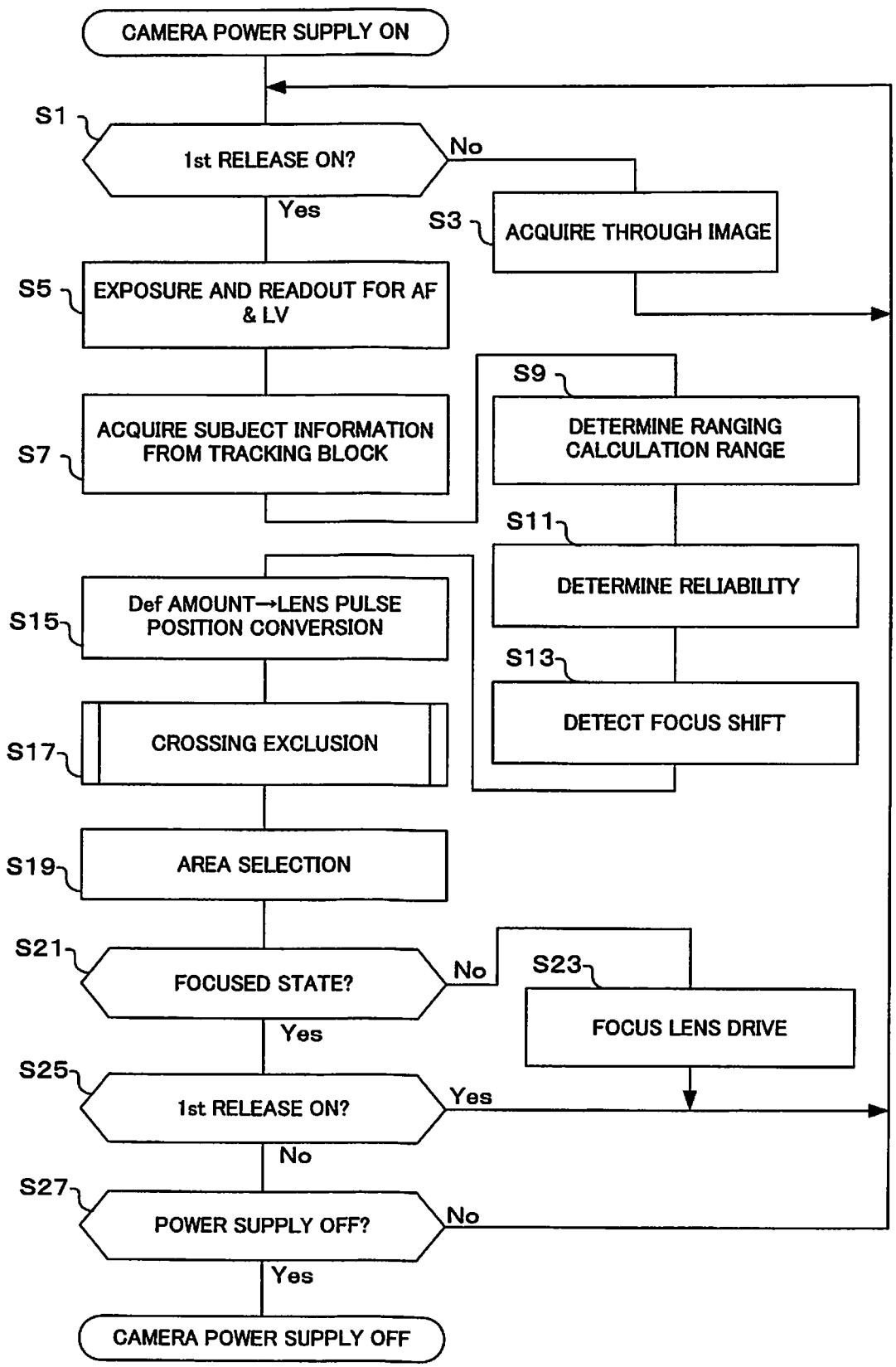
Figure 4A:
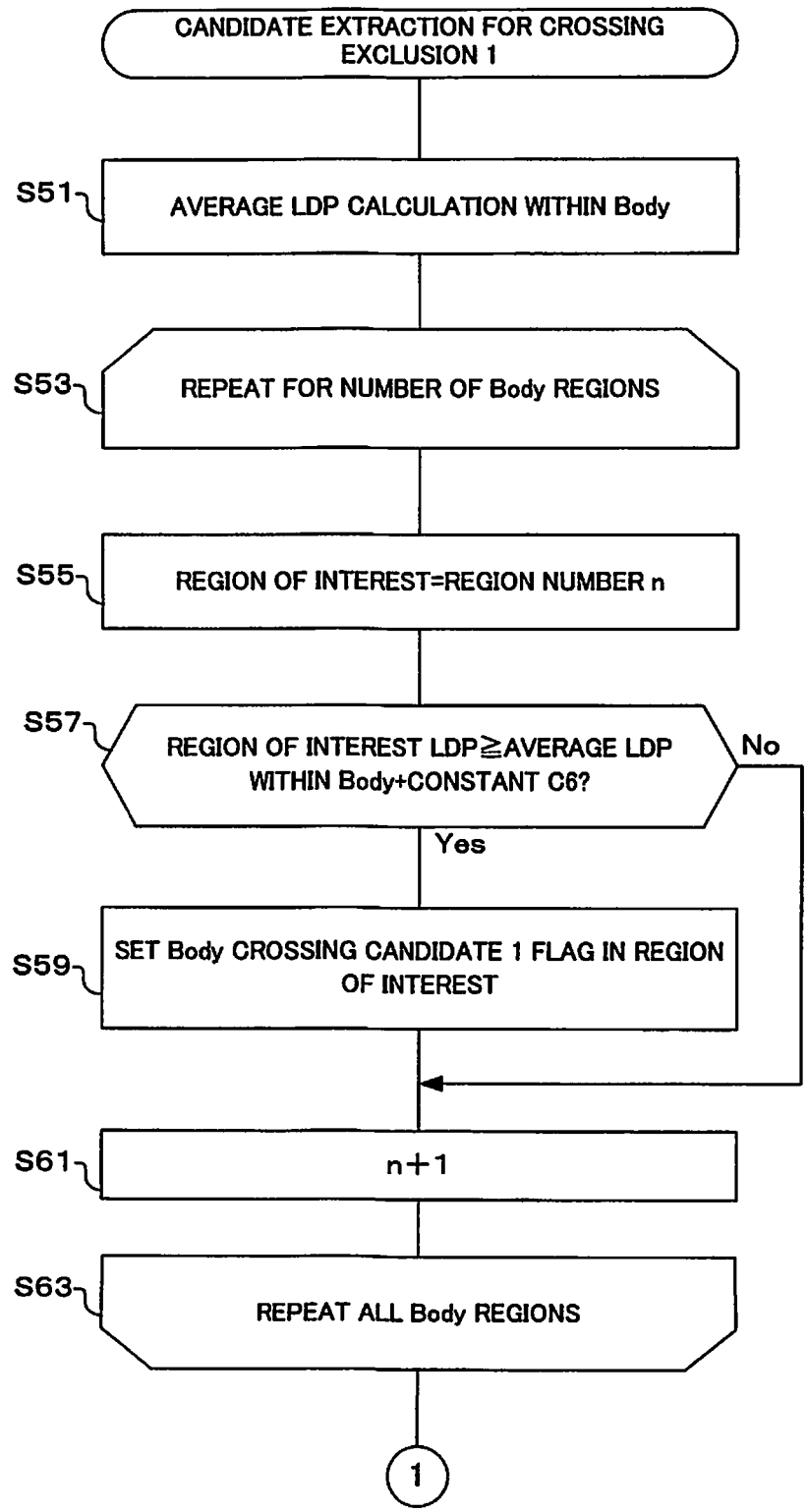
FIG. 4A to FIG. 4C are flowcharts showing operation of candidate extraction for crossing exclusion 1 of an imaging device of one embodiment of the present invention.
Figure 4B:
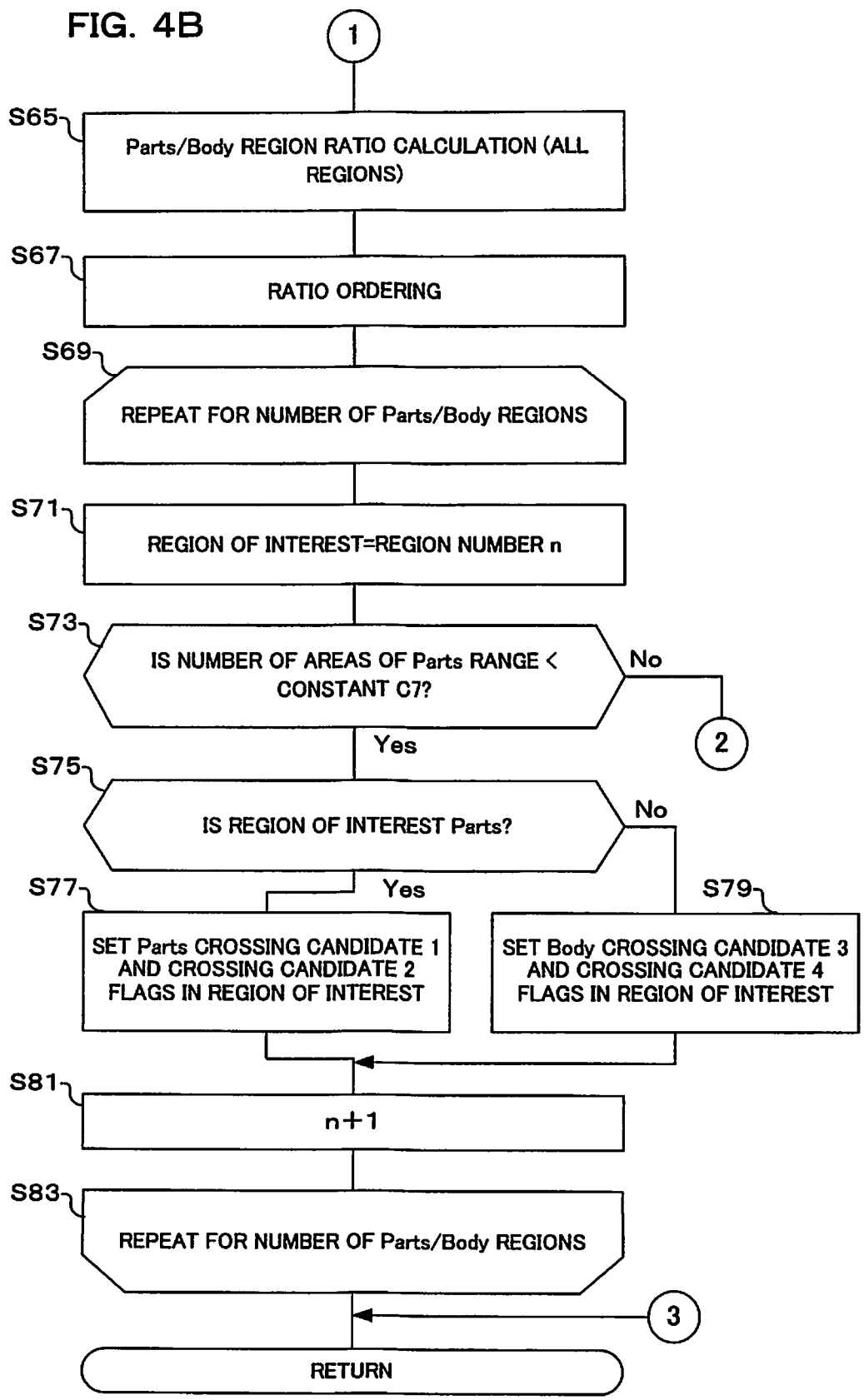

The candidate region setting section 216a functions as a candidate region setting section (processor) that sets regions exhibiting a distance value for a close-range side that is greater than or equal to a specified amount, with respect to a statistic (for example, average value) of distance values of regions corresponding to positions of the main physical object, as unnecessary candidate regions (refer, for example, to S17 in FIG. 2, S37 in FIG. 3, and to FIG. 4A to FIG. 4B). The candidate region setting section (processor) sets first candidate regions within regions corresponding to the main physical object region, and second candidate regions within regions corresponding to regions other than the main physical object region. For example, in FIG. 7, in a case of first candidate regions that are in a body range BO, the second candidate regions corresponding to regions other than a main physical object region are in the parts range PA. Also, in a case of first candidate regions that are in the parts range PA, the second candidate regions are in the outer range.

Also, the candidate region setting section 216a detects regions having substantially the same distance value, within the parts range PA, as majority regions (refer, for example, to S33 in FIG. 3). The candidate region setting section 216a sets third candidate regions inside the second regions (refer to S33 in FIG. 3).

Figure 6A:
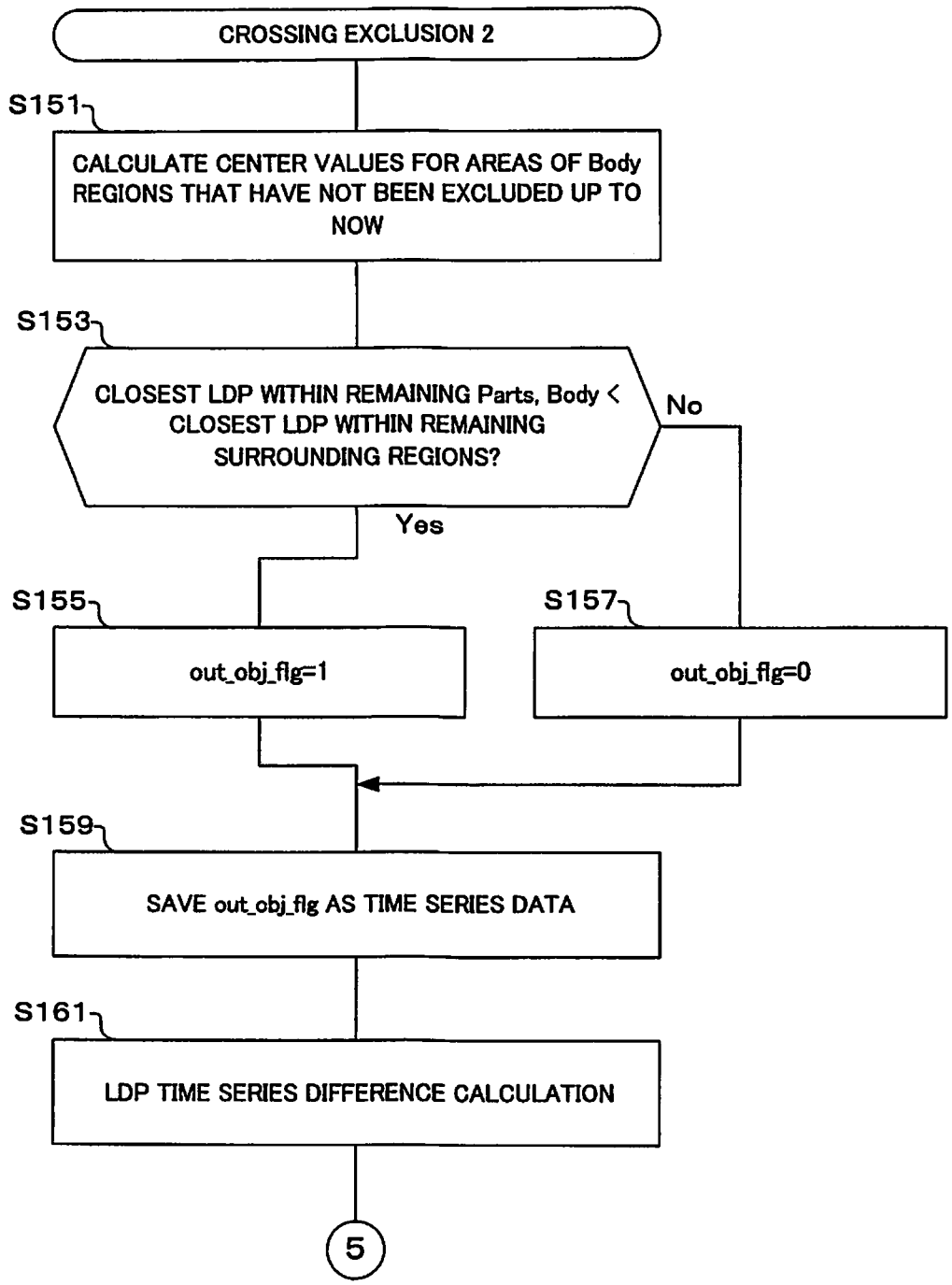
FIG. 6A and FIG. 6B are flowcharts showing operation of crossing exclusion 2 of an imaging device of one embodiment of the present invention.

Also, the candidate region setting section 216a functions as a candidate region setting section (processor) that sets, in regions other than first regions and second regions, regions exhibiting a closer distance than distance value indicating a closest distance, among distance values corresponding to first regions and second regions, to unnecessary candidate regions (refer, for example, to S153 and S155 in FIG. 6A). The above described unnecessary candidate regions are made up of a plurality of AF regions The focus adjustment control section 216b performs drive control of the focus lens, based on reliability values and distance values for each AF area that have been input from the focus detection circuit 222. When performing this drive control, it is determined whether or not a region is an excluded region that is not used in actual focus adjustment, based on distance of a physical object in unnecessary candidate regions that have been set by the candidate region setting section. Drive control of the focus lens is then performed based on distance values of remaining regions within main physical object regions (refer, for example, to S17 to S23 in FIG. 2).

Figure 5A:
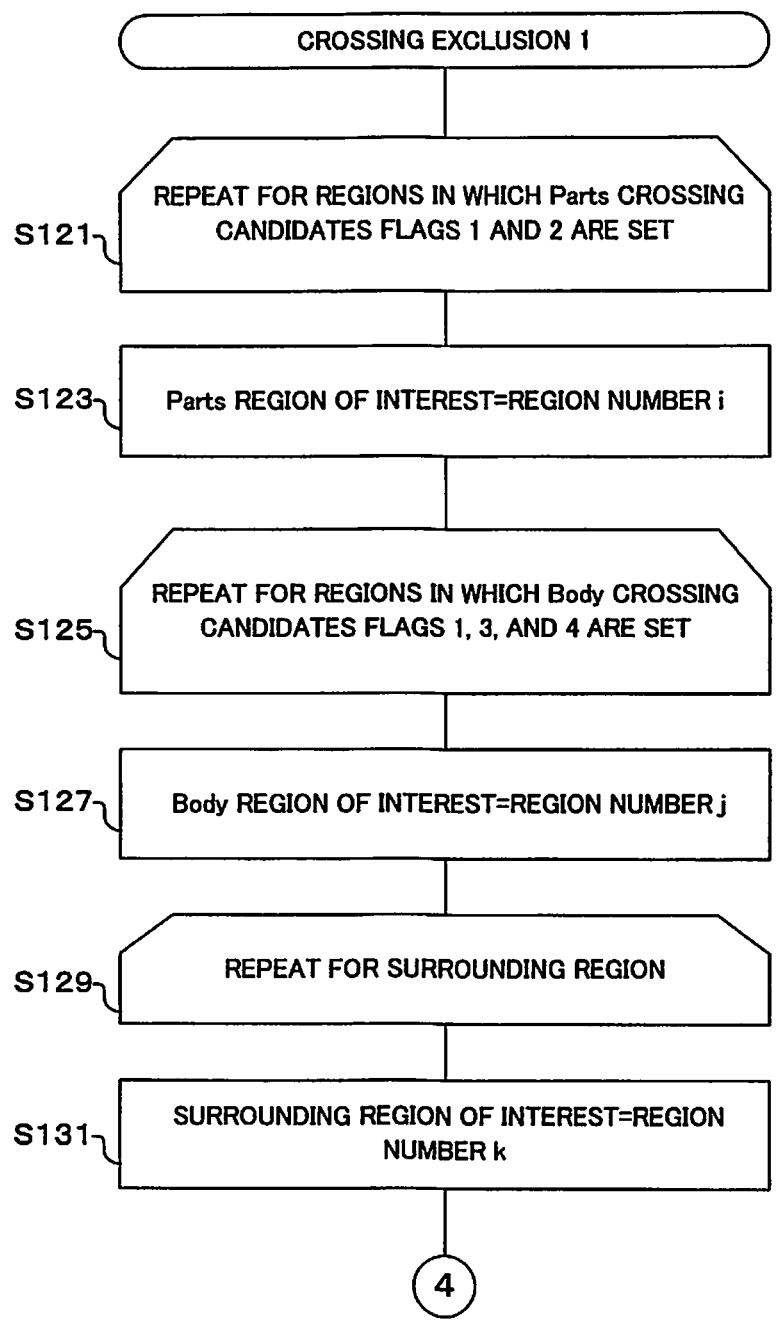
FIG. 5A and FIG. 5B are flowcharts showing operation of crossing exclusion 1 of an imaging device of one embodiment of the present invention.
Figure 5B:
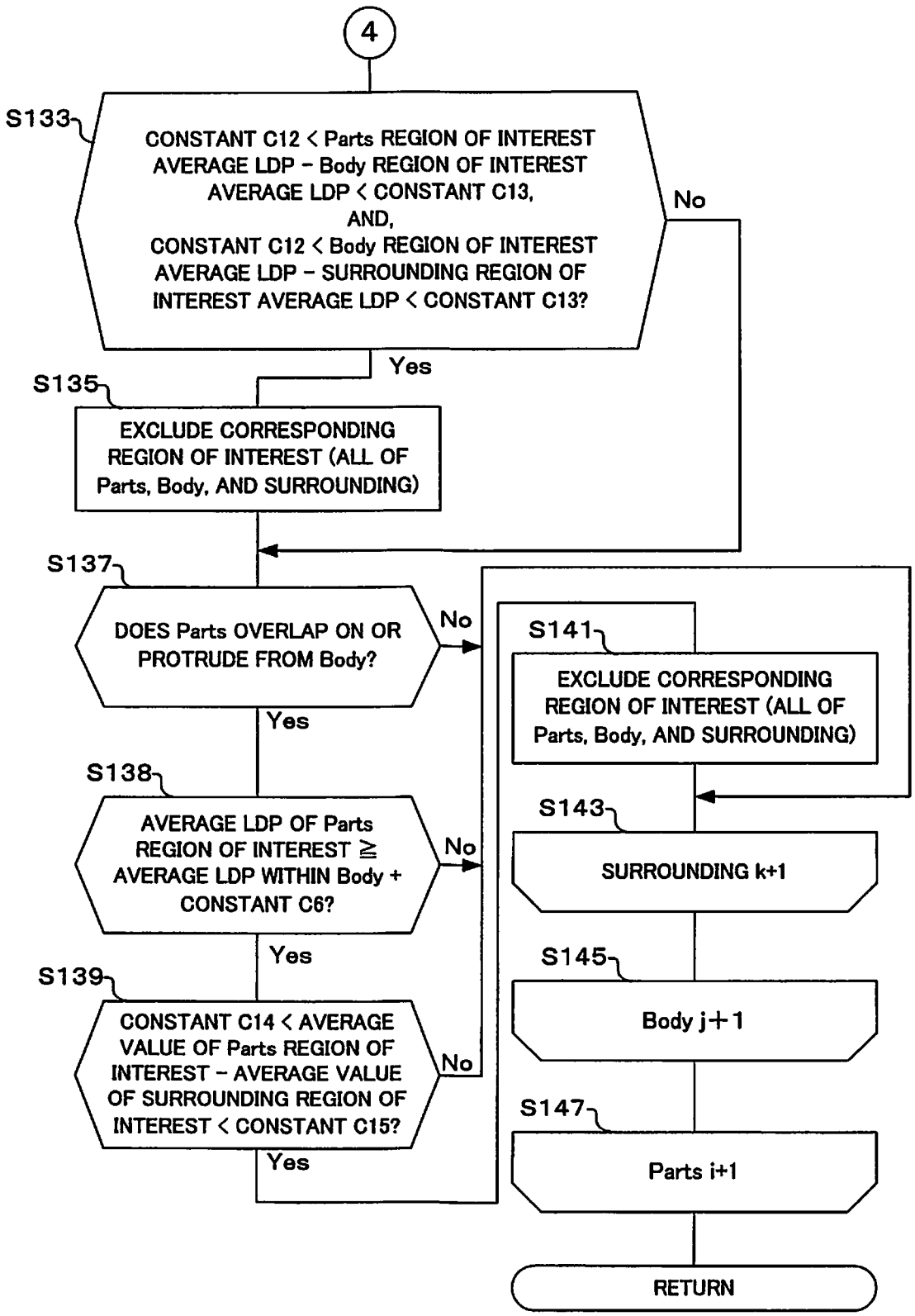

The focus adjustment control section 216b functions as a control section (processor) that determines regions corresponding to unnecessary physical objects based on unnecessary candidate regions, and controls focus adjustment based on distance values corresponding to regions resulting from having excluded regions corresponding to unnecessary physical objects from main physical object regions (refer, for example, to S39 in FIG. 3, and to FIG. 5A and FIG. 5B). The control section (processor) determines regions corresponding to unnecessary physical objects based on first distance values corresponding to first candidate regions and second distance values corresponding to second candidate regions (refer, for example, to S133 in FIG. 5B).

Figure 4C:
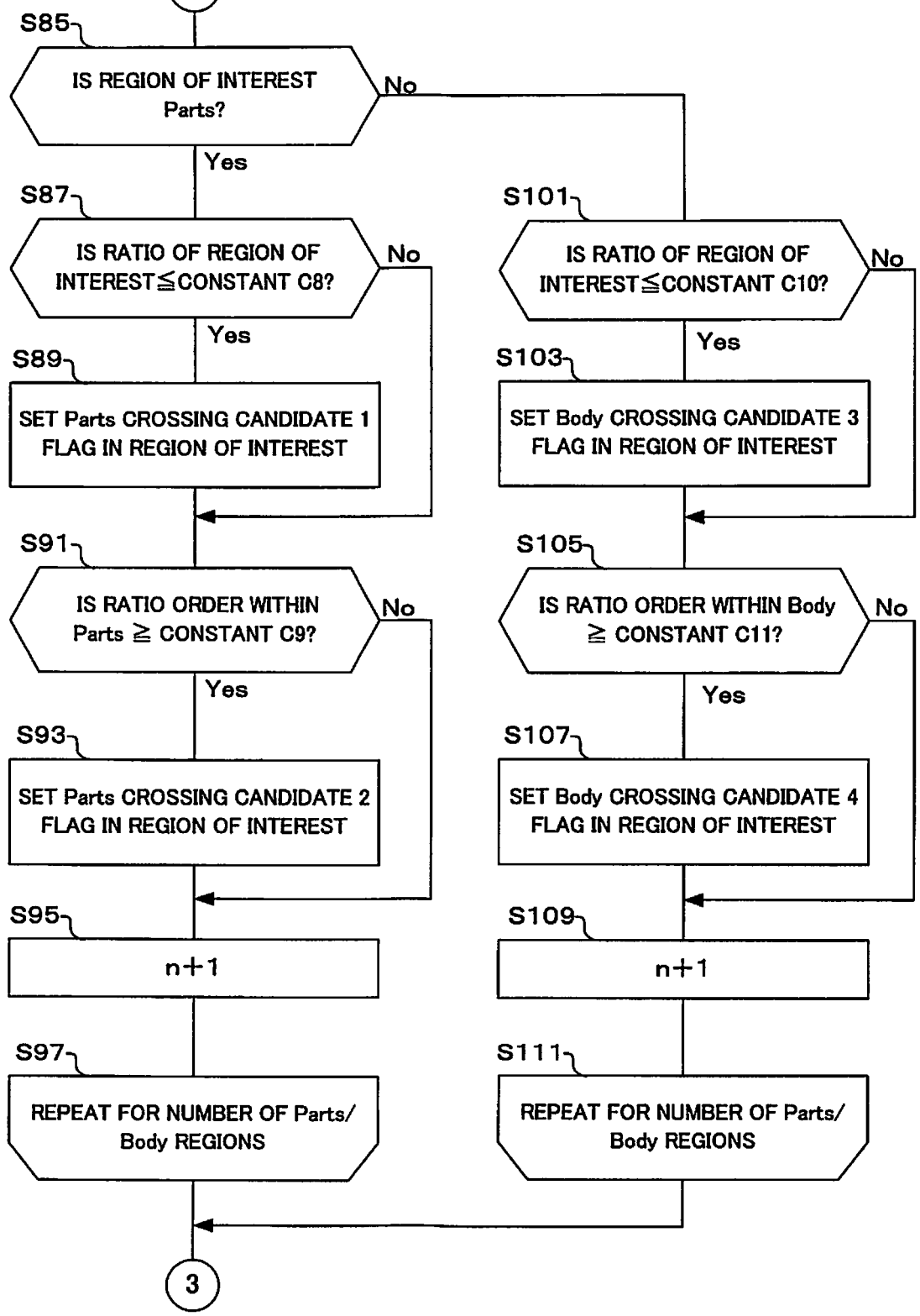

The above described control section (processor) determines that first candidate regions and second candidate regions are regions corresponding to unnecessary physical objects if a difference between a first distance value and a second distance value is within a range of a first specified amount (refer to S133 in FIG. 5B), and a proportion of area of a first candidate region with respect to area of a main physical object region is smaller than a second specified amount (refer, for example, to S87 S89, S101 and S103 in FIG. 4C).

The above described control section (processor) determines regions corresponding to unnecessary physical object based on first distance values and second distance values (for example, average LDP value for majority regions of a parts range), and third distance values corresponding to third candidate regions (for example, distance values of regions of interest of a parts range) (refer, for example, to S87 and S89 in FIG. 4C). Also, the control section (processor) determines the first candidate regions, second candidate regions, and third candidate regions to be regions corresponding to unnecessary physical objects when differences between the first distance values, second distance values, and third distance values is within a range of a third specified amount (refer, for example, to S133 in FIG. 5B). Also, the control section (processor) determines the first candidate regions, second candidate regions, and third candidate regions to be regions corresponding to unnecessary physical objects in the event that a proportion of area of the third candidate regions with respect to area of the second region is smaller than a fourth specified amount (refer, for example, to S65 in FIG. 4B, and S89 in FIG. 4C).

The focus adjustment control section 216b functions as a control section (processor) that determines regions corresponding to unnecessary physical objects based on unnecessary candidate regions, and controls focus adjustment based on distance values corresponding to regions resulting from having excluded regions corresponding to unnecessary physical objects from second regions (refer, for example, to S151 in FIG. 6A). This control section (processor) determines that parts within second regions, having unnecessary candidate regions set across a plurality of frames, that have a difference, of a difference between distance values corresponding to a first region of the newest frame and distance values corresponding to first region of the previous frame, and a difference between distance values corresponding to a second region of the newest frame and distance values corresponding to a second region of the previous frame, that is larger than a fifth specified amount, are regions corresponding to unnecessary physical objects (refer, for example, to S167 in FIG. 6B).

The image processing section 218 has an image processing circuit, and applies various image processing to pixel data. Various image processing such as exposure correction, noise processing, WB gain correction, edge enhancement, and false color correction etc. is applied to image data that has been read out from the image sensor 208 and generated by the ADC 214, or image data that was saved in the DRAM 228, which is internal memory. Further, the image processing section 218 also performs processing (development processing) to convert image data that has been subjected to the above described image processing to a stored data format. For example, at the time of still picture shooting (also including rapid shooting), the image processing section 218 applies image processing for still picture storage and generates still picture data. Similarly, at the time of movie shooting, the image processing section 218 applies image processing for movie storage and generates movie data. Further, at the time of live view display the image processing section 218 applies image processing for display and generates display image data.

It should be noted that the image processing section 218 in this embodiment is a dedicated image processing processor comprising an arithmetic circuit for carrying out image processing calculations. However, this structure is not limiting, and it is also possible to have a structure where, for example, image processing calculations are handled in a general purpose signal processing processor such as a digital signal processor (DSP), based on image processing programs.

The image compression and expansion section 220 has an image compression circuit and an image expansion circuit. At the time of image data storage, the image compression and expansion section 220 compresses image data that has been generated by the image processing section 218 (still picture data or movie data). Also, at the time of image data playback, image data that is stored in the storage medium 232 in a compressed state is expanded.

The focus detection circuit 222 performs focus detection utilizing a phase difference detection method, using pixel data based on pixel signals from phase difference detection pixels of the image sensor 208. Specifically, defocus amount of the focus lens 102a is calculated by a phase difference method that uses phase difference detection pixel data of the image sensor 208. Calculation of this defocus amount is performed for every AF area, each time image data of one frame is output. The phase difference detection pixels on the image sensor 208 are arranged so that detection is possible for each of a plurality of AF areas, as shown in FIG. 7, and it is possible to calculate defocus amount for each AF area.

The focus detection circuit 222 has a reliability determination section 222a and a conversion section 222b. The reliability determination section 222a has a reliability determination circuit, and determines whether or not reliability of the defocus amount that has been calculated for each AF area is high (refer to S11 in FIG. 2). As determination of reliability, determination is based on whether or not contrast amount of an image of phase difference detection pixel data is sufficiently large, whether or not a minimum value of correlation calculation value is sufficiently small, that is, whether or not a correlation value is sufficiently high, or whether a gradient joining a minimum value of correlation calculation value and a larger value of correlation calculation values adjacent to that minimum value, is sufficiently large, etc.

Also, the conversion section 222b has a conversion circuit, and converts defocus amount that has been calculated for each AF area by the focus detection circuit 222 into respective focus lens positions. This conversion is calculated for every AF area, each time image data of one frame is output. This defocus amount is a distance for image plane conversion up to an in-focus position in a case where current position of the focus lens is made a reference, and represents a relative position. The conversion section 222b converts relative in-focus position to an absolute lens position. This absolute lens position is symbolized using lens pulse position (LDP value).

The conversion section 222b functions as a distance value detection section (distance value detection circuit) that detects distance value in accordance with subject distance of a plurality of AF regions, based on the image signal (refer, for example, to S15 in FIG. 2). The conversion section 222b also functions as a distance value detection section (distance value detection circuit) that detects distance values in accordance with subject distance of a plurality of AF regions for every frame, based on the image signal (refer, for example, to FIG. 6A, FIG. 6B, and FIG. 11).

The display section 224 has a display such as a liquid crystal display or an organic EL display, and is arranged on a rear surface etc. of the camera body 200, or is arranged as an electronic viewfinder. This display section 224 displays images in accordance with control by the CPU 216. The display section 224 is used in live view display, in playback display of already stored images, and in display of menu images etc.

The bus 226 is connected to the imaging control circuit 210, ADC 214, CPU 216, image processing section 218, image compression and expansion section 220, focus detection circuit 222, display section 224, DRAM 228, body side storage section 230, storage medium 232, and tracking circuit 234. The bus 226 functions as a transfer path for transferring various data that has been generated in these blocks.

The DRAM 228 is an electrically rewritable volatile memory, and temporarily stores still picture data, movie data, and display image data based on pixel data output from the image sensor 208, and temporarily stores various data such as process data for the CPU 216. It should be noted that it is also possible to use an SDRAM (synchronous dynamic random access memory) as temporary storage.

The body side storage section 230 is an electrically rewritable non-volatile memory. The body side storage section 230 stores various data such as programs used by the CPU 216 and adjustment values for the camera body 200 etc. The storage medium 232 is an electrically rewritable non-volatile memory, and is built into the camera body 200 or configured to be loaded into the camera body 200. The storage medium 232 stores image data for storage as an image file of a specified format. It should be noted that the DRAM 228, body side storage section 230, and storage medium 232 may be respectively configured as a single memory, or may be configured as a combination of a plurality of memories etc.

The tracking circuit 234 tracks a moving subject, such a child or pet that is moving. The tracking circuit 234 is input with image data for every specified frame, calculates a difference while displacing two of image data that have been acquired at different times, and a displacement amount at which a difference value becomes minimum constitutes movement amount of the subject. As a result of this processing movement of the same subject is detected, and the same subject is tracked.

In a case where the tracking circuit 234 has artificial intelligence (AI), a specified subject (for example, a bird, car, person, face etc.) is detected using this AI, and it is possible to track that specified subject. In this case, AI generates an inference model using deep learning, and the inference model that has been generated is set in an inference engine. By inputting image data that has been acquired by the image sensor 208 into this inference engine, it is possible to know position of the specified subject and perform tracking. This tracking circuit 234 may be made to detect the whole of a tracking target and track that target, but with this embodiment it is possible to respectively detect a body, which is a body portion of the tracking target, and parts, which are body parts.

As was described previously, the tracking circuit 234 detects a main subject by means of AI using an inference engine or using hardware circuits etc., and performs tracking of a main subject by detecting movement direction and movement amount of this main subject. When detecting the main subject, it is possible to detect the body and parts of the subject. For example, with the example shown in FIG. 7, the body of a bird is body BO, and a head portion of the bird is parts PA. In this embodiment, two items, namely the body and parts, are detected, but this is not limiting, and three or more portions may be detected. It should be noted that in this embodiment, a tracking function is fulfilled by the tracking circuit 234, but the CPU 216 may be provided with the tracking circuit 234 as peripheral circuitry, and the CPU 216 may be input with image data from the image sensor 208 and perform detection using software.

The tracking circuit 234 functions as a main physical object position detection section (main physical object position detection circuit) that detects position of a main physical object based on the image signal (refer to S7 in FIG. 2). This main physical object position detection section (main physical object position detection circuit) detects position of first regions that contains the entirety of a main physical object, and positions of second regions that contain parts of the main physical object. For example, in FIG. 7, if position of a first region is made body range BO, position of a second region becomes parts range PA (refer to S7 in FIG. 2). The tracking circuit 234 also functions as a main physical object position detection section (main physical object position detection circuit) that detects positions of first regions that contain the whole of a main physical object, and positions of second regions that contain parts of the main physical object, for every frame based on the image signal (refer, for example, to FIG. 6A, FIG. 6B, and FIG. 11).

It should be noted that a face detection circuit may be provided inside the tracking circuit 234, and whether or not a face is contained in the subject is detected. Parts such as faces may also be detected using the previously described AI. Further, parts such as a nose within a face may be detected, and the tracking circuit 234 may be made to track this part. Also, in a case where a main subject is a bird or the like, a face portion of the bird may be detected as a part and tracked. It should be noted that the tracking circuit 234 and focus detection circuit 222 perform detection processing based on image data of the image sensor 208, but there may also be a plurality of image sensors for forming images of the same subject, and the tracking circuit 234 and focus detection circuit 222 may respectively perform detection processing based on image data of separate image sensors.

Next, description will be given for operation of the imaging device that includes the focus adjustment device, using the flowcharts shown in FIG. 2 to FIG. 6B. These flows are realized by the CPU 216 within the camera body 200 controlling each section within the camera body 200 and the interchangeable lens 100 in accordance with programs that have been stored in the body side storage section 230.

If it is detected that the user has performed an ON operation of the power supply of the imaging device 1, the flow for camera power supply ON shown in FIG. 2 is commenced. If the power supply ON operation is detected, it is first determined whether or not a 1st release switch is on (S1). Here, the CPU 216 determines whether or not a 1st release switch that functions as the focus adjustment instruction section 206a of the release button within the operation section 206 is in an on state. If the user focuses on a subject and decides on exposure, the release button is pressed down halfway. If the user performs a half-press operation of the release button, the 1st release switch enters an on state in response to this operation.

If the result of determination in step S1 is that the 1st release switch is not on, a through image is acquired (S3). Here, the CPU 216 outputs a control signal to the drive section 204 so as to put the mechanical shutter 202 in a fully-open state, as well as outputting a control signal to the lens CPU 106 so as to move the aperture 102b by a given amount (for example, open aperture wider). After that, the CPU 216 outputs control signals for the image sensor 208 every predetermined time (time determined by display frame rate), and performs imaging for through image display (also called live view (LV) display) using the image sensor 208. Every time imaging for through image display is completed, the imaging control circuit 210 reads out pixel signals from each pixel. If the CPU 216 has displayed a through image on the display section 224 based on display image data that has been generated in the image processing section 218, step S1 is returned to.

If the result of determination in step S1 is that the 1st release switch is on, then next, exposure and readout for AF & LV are performed (S5). The imaging control circuit 210 performs control of imaging and readout for autofocus (AF) and LV display. Here, image data made up of focus detection pixel data for focus (phase difference) detection used at the time of correlation calculation using a phase difference method, and pixel data for through image display (LV display), is generated based on image data from the image sensor 208, and this generated image data is temporarily stored in the DRAM 228. It should be noted that image data for through image display is also used in tracking detection of the tracking circuit 234.

Figure 8:
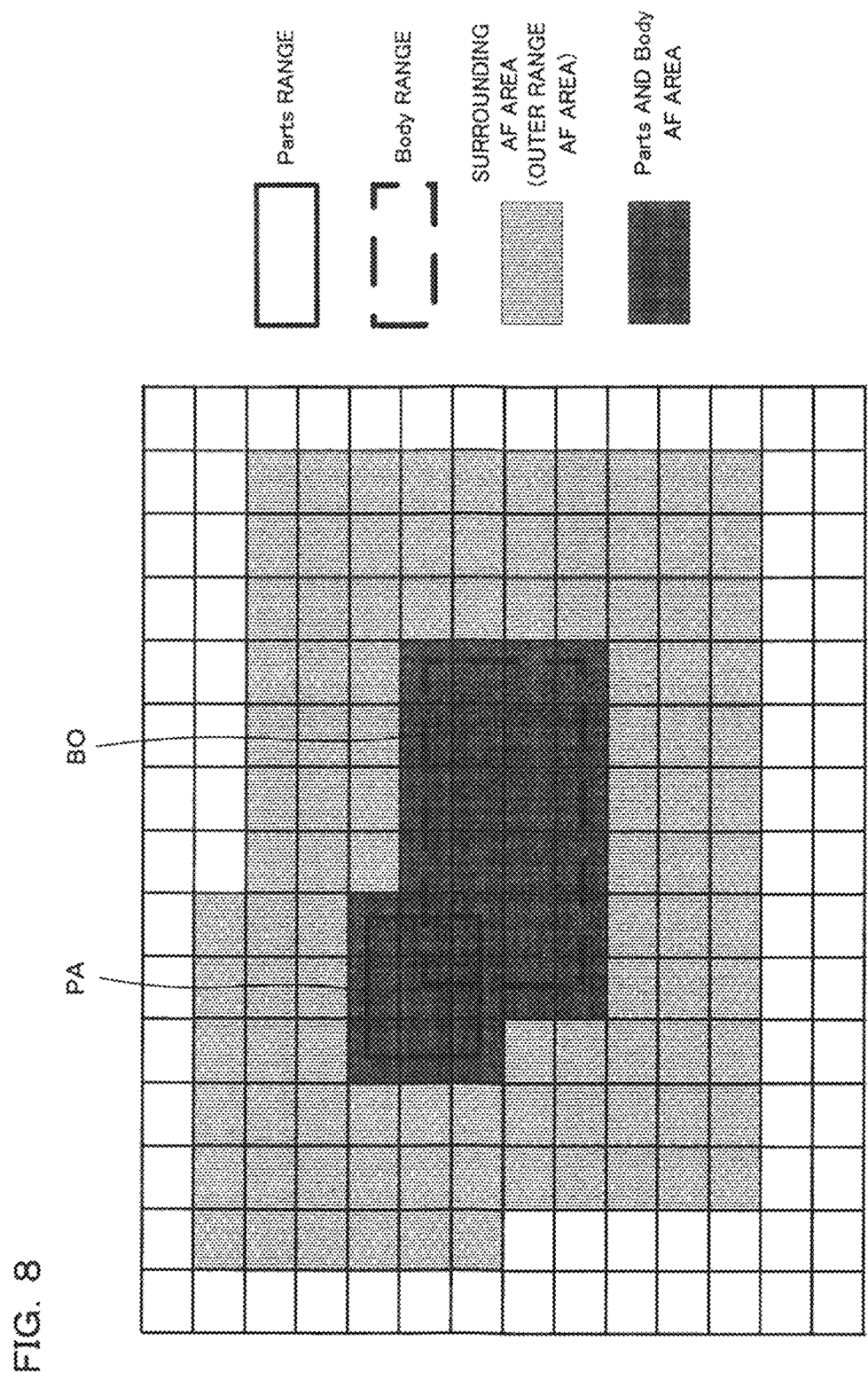
FIG. 8 is a drawing showing another example of separation of subject detection ranges, in the imaging device of one embodiment of the present invention.

Then, subject information is acquired from the tracking block (S7). The tracking circuit 234 can detect position of a main physical object (main subject) based on image data. In this step therefore the CPU 216 obtains subject information of a tracking target from the tracking circuit 234. In this embodiment tracking targets are a body and parts of the tracking target, and as subject information, center XY coordinates and size (width, height) of a body, and center XY coordinates and size (width, height) of parts, are acquired. Regarding parts and a body, if a bird is detected as a subject Sub, as shown in FIG. 7, and this bird is detected as a tracking target, the whole of this bird is the body BO, and portions of the face (head) of the bird are parts (PA). The tracking circuit 234 calculates subject information such as described previously for the body BO and parts PA, and outputs this subject information to the CPU 216. It should be noted that the overall range of the parts PA is not limited to being within the body BO, and some of the parts PA may be outside the body BO, as shown in FIG. 8.

Next, ranging calculation range is determined (S9). The CPU 216 determines ranging calculation range of the focus detection circuit 222 based on the subject information that was acquired in step S7. The body range BO is calculated from central coordinates and width and height of the body, which are subject information from the tracking circuit 234, and the parts range PA is calculated from center coordinate and width and height of the parts. An AF area AFA within the body range BO and an AF area AFA within the parts range PA are determined as ranging calculation ranges. In addition, an AF area AFA within a specified range, outside the body range BO and parts range PA, is also determined as a ranging calculation range. Within this surrounding predetermined range is defined as being AF areas of a constant C1 outside the body range BO and the parts range PA, and is the outer range. With the example shown in FIG. 7, the constant C1 is 1, while with the example shown in FIG. 8 the constant C1 is 3. The constant C1 is appropriately changed in accordance with various conditions, such as, for example, subject type (person, bird, car etc.), focal length (zoom), physical object size (occupied area ratios within the screen), and ranging reliability. A table containing this content is stored in the body side storage section 230, and the CPU 216 sets the constant C1 by referencing this table.

If the ranging calculation range has been determined, next, reliability is determined (S11). Here, the CPU 216 causes execution of correlation calculation in the focus detection circuit 222. The focus detection circuit 222 performs correlation calculation using paired phase difference pixel data, that is stored in the DRAM 226. Correlation calculation is the respective generation of two-image interval values corresponding to phase difference, for AF areas, based on focus detection (phase difference) pixel data within a plurality of specified AF areas (focus detection regions). Once correlation calculation is completed, the reliability determination section 222a within the focus detection circuit 222 performs reliability determination for focus detection. Reliability determination is performed on the basis of known reliability determination methods, such as whether or not contrast of a subject image obtained from pixel data is larger than a specified value, and whether or not a minimum value of correlation calculation values is smaller than a specified value, and whether or not a gradient formed by a minimum value of correlation calculation value, and the larger of correlation calculation values on either side of that minimum value, is larger than a specified value.

If reliability has been determined, next, focus deviation amount is calculated (S13). Here, the CPU 216 converts to a defocus amount [mm], by multiplying a two-image interval value (image shift amount representing correlation calculation results that give a minimum) of AF areas for which the result of determination in step S11 was that reliability was OK by different sensitivity values for each AF area. Also, a contrast best offset amount for the photographing lens (which is almost the same as a frequency shift amount of the photographing lens), which is a different correction amount for each AF area, is added to the defocus amount. It should be noted that the reliability determination of step S11 and the focus deviation amount of step S13 are described in detail in Japanese patent number 2016-230273 (Japanese laid-open patent No, 2018-087862, US Patent Application Publication No. US 2019/0278052), and so detailed description has been omitted. US Patent Application Publication No. US 2019/0278052 is incorporated herein by reference.

If focus deviation amount has been calculated, next, defocus amount (focus deviation amount) is converted to lens pulse position (S15). As was described previously, defocus amount is a relative position that has been calculated with a lens pulse position reference, and so in this step the CPU 216 converts defocus amount of each area to lens pulse position (LDP), so as to always be able to determine absolute position. The conversion to lens pulse position in step S15 is described in detail in Japanese patent application no. 2018-032501 (Japanese patent laid-open No. 2019-148668), and so detailed description has been omitted.

If there has been conversion to lens pulse position, next, crossing exclusion is performed (S17). As shown in FIG. 7, if there is a thin subject CC (crossing subject) such as a branch more to the front (to the close-up end) than a bird, which is a main subject Sub, there will be undesired focus on the crossing subject CC that is in front. This is because if there are more than two subjects in a ranging range, there will be focus on the closest subject. Therefore, in step S17 in a case where a thin subject (crossing subject) such as a branch exists, AF areas CCC containing this crossing subject CC are excluded from targets for focus detection. Detailed operation of this crossing exclusion will be described later using FIG. 3.

If crossing exclusion has been performed, next, area selection is performed (S19). Focus detection is performed in AF areas in a ranging calculation range that was determined in step S9 (S11), further, unnecessary regions (AF areas) are excluded in step S17, and the CPU 216 selects an AF area to be focused on from among remaining AF areas. In the event that a plurality of AF areas remain, selection is performed in line with a specified reference. For example, a focus detection region (AF area) exhibiting a defocus amount corresponding to the closest subject distance (closest range) is selected. Area selection processing is not limited to the closest subject, and it is also possible to select an area in which a person's face exists as a result of face detection, and it is also possible have an area that has been selected manually by the user.

If area selection has been performed, next, focused state is determined (S21). Here, the CPU 216 determines whether or not the focus lens 102a is in a focused state. Specifically, it is determined whether or not focus deviation amount of the focus detection region (AF area) that was selected in the area selection processing of step S19 is within a predetermined permissible range, and a focused state is determined if the focus deviation amount is within the permissible range.

If the result of determination in step S21 is not a focused state, focus lens drive is executed (S23). Here, the CPU 216 performs communication with the lens CPU 106 to output a control signal to the lens CPU 106 so as to drive the focus lens 102a to a focus lens position that was calculated for the AF area that was selected in step S19. Upon receiving this control signal, the lens CPU 106 drives the focus lens 102a by means of the drive section 104 to a position that has been instructed. Once the focus lens 102a has been driven processing returns to step S1.

If the result of determination in step S21 is a focused state, it is next determined whether or not the 1st release is on (S25). Here, similarly to step S1, the CPU 216 determines whether or not a 1st release switch that functions as the focus adjustment instruction section 206a within the operation section 206 is in an on state. If the result of this determination is that the 1st release switch is on, processing returns to step S1.

On the other hand, if the result of determination in step S25 is that the 1st release switch is off, it is determined whether or not the power supply is off (S27). Here, the CPU 216 detects state of the power supply switch within the operation section 206, and determines whether or not the power supply is off. If the result of determination in step S27 is that the power supply is not off, processing returns to step S1. Also, if the result of this determination is that the power supply switch is off, power supply off processing is performed. It should be noted that in a case where the first release is on in step S25 (S25, Yes), it is determined whether or not the release button has been pressed down fully, and if the release button has been pressed down fully exposure is performed by opening the shutter in order to take a still picture or the like, and then image data that has been acquired by the image sensor 208 after exposure is completed is stored in the storage medium 232. This processing is known, and so detailed description is omitted.

Next, detailed operation of the crossing exclusion in step S17 (refer to FIG. 2) will be described using the flowchart shown in FIG. 3. The flow for this crossing exclusion involves the excluding of AF areas that contain long, thin (small area) subjects such as branches that are in front of the main subject, as in FIG. 7, from targets for focus adjustment. It should be noted that in the following description a range in which a parts range and a body range overlap is treated as a parts range. Then, processing is performed to handle a range that does not contain a parts range, within body range information that has been output from the tracking circuit 234, as a body range.

If the flow for crossing exclusion shown in FIG. 3 is commenced, first, a depth map is created (S31). A depth map is created in order to classify AF areas, for which comparable defocus amount or distance has been calculated, into groups. In step S13, the focus detection circuit 222 calculates defocus amount for each AF area, and calculates lens position LDP based on defocus amount. In this step S31, the CPU 216 arranges respective LDP values within a parts range, within a body range, and within an outer range in a descending order, and then calculates differences for each LDP. An LDP (Lens Defocus Pulse) value is a value that represents position of the focus lens, as was described previously, with a large LDP meaning that the lens is positioned at the close-up end, and a small LDP meaning that the lens is positioned at the long distance side, that is, meaning that it is positioned towards a background.

In step S31, each difference value of LDP value is arranged in descending order, and if a difference value is greater than a constant C2 that region is made a boundary. That is, parts of a subject that are a comparable distance away from the imaging device 1 have a comparable LDP, and LDP of different sections, or other subjects, will become separate values. Accordingly, it is possible to divide subjects into regions in AF area units, based on LDP difference values. If division into regions has been performed on the basis of difference in LDP, the CPU 216 assigns numbers to each region in the order 0, 1, 2, . . . from the region at the close-up end. This assigning of number is performed for the parts range, body range, and outer range, respectively. It should be noted that with this embodiment, at the time of region division there is arrangement of regions in descending order, but this is not limiting and it is also possible to perform region division in ascending order. Also, the depth map has been created based on differences in LDP, but the depth map may also be created using defocus amount. Constant C2 may be changed in accordance with various conditions, such as, for example, subject type (person, bird, car etc.), focal length, subject size, ranging reliability etc.

Once a depth map has been created, next, calculation of majority regions is performed (S33). As was described previously, in step S31 region boundaries were defined based on LDP difference value, and numbers assigned in order from the close-up end based on LDP that was calculated for each AF area. In this step, regions that have a number of AF areas of greater than a fixed value are extracted, for every range (parts, body, surrounding (outer)). Specifically, a number of AF areas is calculated for each of the regions that were determined with boundaries defined in step S31, regions having this number of AF areas of greater than constant C3 are extracted, and these regions are made majority regions. Hereafter these majority regions will simply be called regions. Also, for the body range, parts range, and outer range respectively, this region is made a body region, parts region, and surrounding region. Regions made up of a number of AF areas that is smaller than constant C3 are deemed to have low reliability, and are excluded from the following processing.

Once the majority regions have been calculated, exclusion of background regions is performed (S35). A plurality of majority regions that were extracted in step S33 are equivalent to subjects at various distances respectively from the close-up end to the background. In this step, therefore, the CPU 216 excludes regions corresponding to a background from among the majority regions that have been calculated. First, the CPU 216 calculates average value of LDP for every region. Then, average LDPs of each region that has been calculated are arranged in descending order (in order of closest distance), and a difference between each average LDP value is calculated. Looking at the difference values in descending order, portions where difference value of greater than constant C4, where a max of all difference values is greater than constant C5, are made boundaries of the background and other than the background, and regions that are further away than this boundary (having smaller average LDP) are excluded as background regions. It should be noted that constant C4>constant C5 is set, and processing for constant C4 is given priority. Constants C3, C4, and C5 may be changed in accordance with various conditions, such as, for example, subject type (person, bird, car etc.), focal length, subject size, ranging reliability etc.

If processing for boundary region exclusion has been performed, next, candidates for crossing exclusion 1 are extracted (S37). Crossing exclusion 1 is executed in step S39, but before that AF areas that will constitute candidates at the time of processing for crossing exclusion are extracted in this step. It should be noted that crossing exclusion 1 (S39) is processing to exclude thin subjects (crossing subjects) such as branches that are in front of the main subject, such as shown in FIG. 7, from AF areas for focus detection, as was described previously. Detailed operation of the candidate extraction for this crossing exclusion 1 will be described later using the flowcharts shown in FIG. 4A to FIG. 4C.

If candidates for crossing exclusion 1 have been extracted, next, crossing exclusion 1 is performed (S39). Crossing exclusion 1 involves setting regions in which an object straddles a body range, parts range, and outer range as crossing subjects, and then excluding regions that contain the crossing subjects from AF areas for focus adjustment. This processing may be performed for a movie image and for a still image (including rapidly taken images). This processing for crossing exclusion 1 is performed by comparing LDP for every region of the body regions, parts regions, and surrounding regions that were obtained in the body range, parts range, and outer range, and extracting regions for which comparable average LDP is calculated. Detailed operation of the crossing exclusion 1 will be described later using the flowcharts shown in FIG. 5A and FIG. 5B.

If crossing exclusion 1 has been executed, next, crossing exclusion 2 is performed (S41). As a result of crossing exclusion 1 subjects of sufficiently small area to cross in front of the main subject are excluded, and it is possible to prevent focusing on crossing subjects. However, in the case of movie images and rapidly taken images, there may be cases where even if a crossing subject does not exist in a previous frame a crossing subject suddenly appears in the next frame, and there is a possibility of focusing on this suddenly appearing crossing subject. Therefore, with crossing exclusion 2, crossing subjects that could not be excluded using crossing exclusion 1 are excluded from targets of focus adjustment. With this crossing exclusion 2, determination is performed also using defocus amount of the previous frame. When performing this determination, with this embodiment only crossing subjects in parts ranges are excluded. Detailed operation of the crossing exclusion 2 will be described later using the flowcharts shown in FIG. 6A and FIG. 6B. If the processing for crossing exclusion 2 is completed, the originating flow is returned to.

Next, operation of candidate extraction for crossing exclusion 1 shown in step S37 (refer to FIG. 3) will be described using the flowcharts shown in FIG. 4A to FIG. 4C.

If operation of candidate extraction for crossing exclusion 1 shown in FIG. 4A is commenced, first, average LDP within a body is calculated (S51). Here, the CPU 216 calculates average of LDPs relating to all AF areas within a body range other than the background. Average may be a simple average, or a weighted average corresponding to degree of reliability of AF areas.

If average LDP within a body has been calculated, next, in steps S53 to S63, regions having an LDP for each region (body region) contained within the body range of greater than the average LDP within the body, in other words regions that are at the close-up end, are extracted. This is processing for extracting close-up end subjects that have a high possibility of being crossing subjects as exclusion candidates.

First, n is assigned as a region number for regions of interest (body region) within the body range (S55). An initial region number assigned here is n=0, and subsequently every time steps S53 to S63 are repeated 1 is added to n (refer to step S61, which will be described later).

If a region number has been assigned to a region of interest, then next it is determined whether or not LDP of the region of interest is greater than average LDP within the body+constant C6 (S57). Here, the CPU 216 determines whether or not LDP of region of interest n is a value that is greater by constant C6 plus the average LDP within the body that was calculated in step S51.

If the result of determination in step S57 is that LDP of the region of interest is greater than average LDP within the body+constant C6, then a body crossing candidate 1 flag is set in the region of interest (S59). In the event that LDP of region of interest n is greater than average LDP within the body+constant C6, then there is a high possibility that subject distance of the region of interest is more to the close-up end than average distance of the body range. The region of interest is more to the close-up end than the body range, and crosses the body range, and so the CPU 216 determines the region of interest to be body crossing. A flag representing that there is a candidate for performing exclusion using body crossing (body crossing candidate 1 flag) is then set.

If the body crossing candidate 1 flag is set in step S59, or if the result of determination in step S57 is not that LDP of the region of interest was greater than average LDP within the body+constant C6, then next 1 is added to the region number n (S61). As was described previously, if 1 is added to the region number n processing returns to step S55, and the previously described operation is repeated. If the region number n finally reaches the final region within all body ranges, processing to repeat steps S53 to S63 is completed, and processing advances to step S65.

Next, for parts range and body range, ratios (area ratios) of regions respectively contained in those ranges are calculated (S65). Here, the CPU 216 calculates a ratio Rp for each region (parts region) within the parts range, and ratio Rb of each region (body region) within the body range, based on equations (1) and (2) below. It should be noted here that Np represents a number of AF areas of each parts region, and Nbp represents a number of AF areas within a parts range other than a background region. Also, Nb represents number of AF areas of each body region, and Npb represents number of AF areas within a body range other than a background region.

$$Rp = Np/Nbp \quad (1)$$

$$Rb = Nb/Npb \quad (2)$$

Next, ratio ordering is performed (S67). Respective ratios were calculated for parts regions and body regions in step S65, and so in this step the CPU 216 performs ordering of respective ratios for the parts regions and the body regions in order of size, such as 0, 1, 2, . . . .

FIG. 9 shows an example of ratio calculation and ratio ordering of steps S65 and S67. With this example, a total number of areas, which is number of all AF areas within a parts range, is 30, and a number of background areas, which is a number of AF areas determined to be background regions within a parts range, is 5. Also, there are 5 parts regions, being parts region 0 to parts region 4. If it is set that a number of AF areas of a parts region 0 is 4, then by substituting numerical values into equation (1) ratio Rp0 becomes 4/(30−5)=0.16. Similarly ratio Rp1 of parts region 1 becomes 6/(30−5)=0.24, and ratio Rp2 of region 2 becomes 3/(30−5)=0.12. Once ratios have been calculated, ratio order becomes parts region 1, parts region 0, parts region 2 (parts regions 3 and 4 have been omitted).

Next, from step S69 to S83, in the process for excluding crossing subjects, processing is performed so as not to exclude valid regions of parts and body. In these steps, occupancy ratios for each parts region and each body region with respect to respective ranges for body and parts are calculated, and regions having small ratios are made crossing subject candidates. In the event that a crossing subject has a sufficiently large area, it ought to be possible for the tracking circuit 234 to detect such a large subject. Accordingly, regions that have a small area that the tracking circuit 234 has not detected have a high possibility of being a crossing subject that should be excluded.

First, similarly to step S55, a region number n is assigned to regions of interest (S71). A region number initially assigned here is n=0, and subsequently every time steps S69 to S83 are repeated 1 is added to n (refer to steps S83, S95 and S109, which will be described later).

If region numbers have been assigned to regions of interest, then next, it is determined whether or not a number of areas (AF areas) of a parts range is less than constant C7 (S73). A parts range often has a small area compared to a body range, such as the face of a bird. In this case, if the parts range is smaller than specified, the CPU 216 sets as a candidate for exclusion without considering the ratio that was calculated in step S65.

If the result of determination in step S73 is that the number of AF areas of the parts range was less than constant C7, it is next determined whether or not a region of interest is parts (parts region) (S75). Regions of interest are assigned a region number that bears no relation to whether or not it is in a parts range or in a body range, and stored (refer to S71). In this step, the CPU 216 determines whether or not a region of interest is within a parts range by referencing information that has been stored, based on region number of the region of interest.

If the result of determination in step S75 is that the region of interest is within a parts range, a parts crossing candidate 1 flag and a parts crossing candidate 2 flag are set in the region of interest (S77). On the other hand, if the result of determination in step S75 is that the region of interest is not within a parts range, a body crossing candidate 3 flag and a body crossing candidate 4 flag are set in the region of interest (S79). If the number of AF areas of the parts range is smaller than a specified value (constant C7), then regions of interest within the body range are also made crossing candidates (body crossing candidate 3 flag and body crossing candidate 4 flag), in order to perform determination of crossing subjects more carefully.

If flags have been set in steps S77 or S79, next, 1 is added to the region number n (S81). As was described previously, if 1 is added to the region number n, processing returns to step S69, and the previously described operation is repeated. If region number n finally reaches all regions of the body range and the parts range (parts regions, body regions), processing to repeat steps S69 to S83 is completed, and the originating flow is returned to.

Returning to step S73, if the result of determination in this step is that the number of areas (AF areas) of the parts range is not smaller that constant C7, it is next determined whether or not the region of interest is a parts range (S85). Here, the CPU 216 determines if a region of interest is within a parts range or within a body range by referencing stored information based on region number.

If the result of determination in step S85 is that a region of interest is parts (within a parts range), it is next determined whether or not a ratio for the region of interest is less than constant C8 (S87). Ratio of a region of interest is calculated based on equation (1) in step S65, and so the CPU 216 performs determination based on this calculation result.

If the result of determination in step S87 is that ratio of the region of interest is less than constant C8, the parts crossing candidate 1 flag is set in the region of interest (S89). Since the proportional occupancy of this region of interest is low, that is, the area of this region of interest is small, and there is a high possibility of being a crossing subject, a flag is set as a crossing candidate 1.

If a flag has been set in step S89, or if the result of determination in step S87 is that ratio of the region of interest is not less that constant C8, it is next determined whether or not a ratio order within parts is greater than constant C9 (S91). The order of a ratio of a region of interest for within a parts range is obtained in step S67, and the CPU 216 performs determination based on the result of this ordering.

If the result of determination in step S91 is that ratio order of the region of interest is greater than constant C9, a parts crossing candidate 2 flag is set in the region of interest (S93). The numerical value of the ratio order being large means that the proportional occupancy of this region of interest is low, namely that the area of the region of interest is narrow, and there is a high possibility of being a crossing subject, and so a flag is set as a crossing candidate 2.

If a flag has been set in step S93, or if the result of determination in step S91 is that ratio order of the region of interest was not greater than constant C9, then next 1 is added to the region number n (S95). As was described previously, if 1 is added to the region number n processing returns to step S69, and the previously described operation is repeated. If region number n finally reaches the final region of all regions of the body range and the parts range, processing to repeat steps S69 to S97 is completed, and the originating flow is returned to.

Returning to step S85, if the region of interest is not parts (parts range), it is next determined whether or not a ratio for the region of interest is less than constant C10 (S101). Ratio of a region of interest in a body range (body region) is calculated based on equation (2) in step S65, and so the CPU 216 performs determination based on this calculation result.

If the result of determination in step S101 is that ratio of the region of interest is less than constant C10, a body crossing candidate 3 flag is set in the region of interest (S103). Since the proportional occupancy of this region of interest is low, that is, the area of this region of interest is narrow, and there is a high possibility of being a crossing subject, a flag is set as a crossing candidate 3.

If a flag has been set in step S103, or if the result of determination in step S101 is that ratio of the region of interest is not less that constant C10, it is next determined whether or not a ratio order within the body is greater than constant C11 (S105). The order of a ratio of a region of interest for within a body range is obtained in step S67, and so the CPU 216 performs determination based on the result of this ordering.

If the result of determination in step S105 is that ratio order of the region of interest is greater than constant C11, a body crossing candidate 4 flag is set in the region of interest (S107). The numerical value of the ratio order being large means that the proportional occupancy of this region of interest is low, namely that the area of the region of interest is narrow, and there is a high possibility of being a crossing subject, and so a flag is set as a crossing candidate 4.

If a flag has been set in step S107, or if the result of determination in step S105 is that ratio order of the region of interest was not greater than constant C11, then next 1 is added to the region number n (S109). As was described previously, if 1 is added to the region number n processing returns to step S69, and the previously described operation is repeated. If region number n finally reaches the final region of all regions of the body range and the parts range (body regions, parts regions), processing to repeat steps S69 to S111 is completed, and the originating flow is returned to. Constants C6 to C11 may be changed in accordance with various conditions, such as, for example, subject type (person, bird, vehicle, etc.), focal length, focus position, subject (parts, body) size, ranging reliability of AF area of the region of interest, etc.

Next, operation for crossing exclusion 1 shown in step S39 (refer to FIG. 3) will be described using the flowcharts shown in FIG. 5A and FIG. 5B. The flow for crossing exclusion 1 involves searching for a crossing subject in a body range, parts range, and outer range, and excluding this subject from targets of focus detection. Specifically, average LDP is calculated for every region (body region, parts region, surrounding region) that was determined in steps S33 and S35 (refer to FIG. 3), and if the value for average LDP is in a specified range of a body range, parts range, and outer range, it is determined that a crossing subject exists. Because, if average LDP is substantially the same for body range and parts range etc., it can be considered that the same object is crossing these ranges.

If the flow for crossing exclusion 1 shown in FIG. 5A is commenced, first, repeating processing is commenced for regions in which the parts crossing candidate flag 1 and parts crossing candidate flag 2 are set (S121). These flags are set in steps S77, S89 and S93. Next, a parts region of interest is made region number i (S123). When executing step S123 for the first time i=0 is set, and subsequently 1 is added to i (refer to step S147). Specifically, steps S121 to S147 are executed while sequentially adding to the region number that represents the parts region of interest, from 0.

Next, repeating processing is commenced for regions in which the body crossing candidate 1 flag, body crossing candidate flag 3, and body crossing candidate flag 4 are set (S125). These flags are set in steps S59, S79, S103 and S107. Next, the body region of interest (body region) is set to region number j (S127). When executing step S127 for the first time j=0 is set, and subsequently 1 is added to j (refer to step S145). Specifically, steps S125 to S145 are executed while sequentially adding to the region number that represents the body region of interest, from 0.

Next, repeating processing is commenced for the surrounding region (S129). Next, a surrounding region of interest is made region number k (S131). When executing step S131 for the first time k=0 is set, and subsequently 1 is added to k (refer to step S143). Specifically, steps S129 to S143 are executed while sequentially adding to the region number that represents the surrounding region of interest, from 0.

The structure of the processing loops will now be described. In steps S121 to S131, and S143 to S147, for the commencement and end of three loops, when executing the flow for crossing exclusion 1, first, parts region of interest number i and body region of interest number j are fixed, and steps S133 to S141 are executed for surrounding region number k while sequentially changing in the manner 0, 1, 2, . . . . If the surrounding region number k becomes a final value, next, 1 is added to the body region of interest number j, this added j and a parts region of interest number i are fixed, and steps S133 to S141 are executed for the surrounding region number k while sequentially changing in the order 0, 1, 2, . . . . If the body region of interest number j becomes a final number, then next, 1 is added to the parts region of interest number i, and as was described previously, steps S133 to S141 are executed while sequentially changing the surrounding region of interest number k and the body region of interest number j.

If the surrounding region of interest is set to region number k in step S131, then next, it is determined whether or not "constant C12<parts region of interest average LDP-body region of interest average LDP<constant C13, and constant C12<body region of interest average LDP-surrounding region of interest average LDP<constant C13" (S133). Since a depth map is created in step S31 by calculating LDP of each AF area, and a region is calculated in step S33, the CPU 216 obtains average LDP of each region by averaging LDP of each contained AF area, within each region, for every region that has been calculated, that is, for every body region, parts region, and surrounding region. Here, the constant C12 is assumed to be a negative value, and the constant C13 is assumed to be a positive value.

If the result of determination in step S133 is that difference for each LDP is within the ranges of constant C12 and constant C13, the corresponding region of interest is excluded (S135). If a difference between average LDP of a region of interest in a parts range and average LDP of a region of interest in a body range is within a specified range, subject distances for two regions of interest are substantially the same, and it can be considered that the same object exists straddling the parts range and the body range. Similarly, if a difference between average LDP of a region of interest in a body range and average LDP of a region of interest in an outer range is within a specified range, subject distances for two regions of interest are substantially the same, and it can be considered that the same object exists straddling the body range and the outer range. This state is the state shown in FIG. 10C. Specifically, FIG. 10C shows a state where the parts range PA does not project outside of the body range BO, and a boundary of the parts range and the body range do not overlap. In this case, if a crossing subject CC straddles an outer range, body range BO, and parts range PA, respective distances (LDP) of portions that are contained in the outer range, body range BO and parts range PA of the crossing subject CC are determined to be substantially the same. Accordingly, if the conditions shown in step S133 are satisfied, it can be considered to be a crossing subject, and so in step S135 all regions of interest (corresponding regions) for parts range, body range, and outer range are excluded from targets for focus adjustment.

If a corresponding region of interest has been excluded in step S135, or if the result of determination in step S133 was No, then next it is determined whether the parts range overlaps on the body range, or whether or not the parts range protrudes from the body range (S137). In this step, the CPU 216 performs determination based on data relating to a parts range and body range that the tracking circuit 234 has detected. The parts range overlapping the body range does not mean simply that part of the parts range PA is overlapped on the body range BO, but that all of the parts range PA is contained within the body range BO, as shown in FIG. 10A, and at least one edge that separates the parts range PA overlaps a boundary of the body range BO. Also, the parts range protruding from the body range means that part of the parts range PA is contained in the body range BO, and remaining part of the parts range PA is not contained in the body range BO, as shown in FIG. 10B.

If the result of determination in step S137 is that a parts range is overlapping on the body range, or protruding, it is next determined whether or not average LDP value of the parts region of interest≥average LDP value within the body+ constant C6 (S138). If the determination in step S138 is Yes, it is next determined whether or not constant C14<average LDP value of the parts region of interest−average LDP value of surrounding region of interest<constant C15 (S139). Since the determination in step S137 was Yes, it is a case such as in FIG. 10A or FIG. 10B. Then, if average LDP value of a region of interest of a parts range is greater than a value resulting from having added constant C6 to average LDP value within the body range, subject distance of the region of interest of the parts range is more to the close-up end than average distance of the body range, and there is a possibility of the region of interest of the parts range being a candidate for crossing exclusion. In this case, average LDP value of the region of interest of the parts range and average LDP value of the region of interest of the outer range are determined to be substantially the same.

If the result of determination in step S139 is Yes, the corresponding region of interest is excluded (S141). This case is a difference between average LDP of two regions of interest, of a parts range and an outer range, being within a specified range (larger than constant C14, smaller than constant C15), which means that subject distances of the two regions of interest, of a parts range and an outer range, are substantially the same, and it can be considered that the same object is straddling the parts range and the outer range. Therefore, the CPU 216 excludes the corresponding regions of interest of the parts range and the outer range from targets for focus adjustment.

If the corresponding region of interest has been excluded in step S141, or if the result of determination in steps S137 or S138 or S139 was No, 1 is added to the region number k of the surrounding region of interest (S143), and previously described step S129 is returned to. If processing for a final number of the region number of the surrounding region of interest is completed, next, 1 is added to the region number j of the body region of interest (S145), and previously described step S125 is returned to. If processing for a final number of the region number of the body region of interest is completed, next, 1 is added to the region number i of the parts region of interest (S147), and previously described step S121 is returned to. If processing for a final number of region number of a parts region of interest is completed, the flow for crossing exclusion 1 is terminated, and the originating flow is returned to. Constants C6 and C12 to C15 may be changed in accordance with various conditions, such as, for example, subject type (person, bird, vehicle, etc.), focal length, focus position, subject (parts, body) size, ranging reliability of AF area of the region of interest, etc.

Figure 6B:
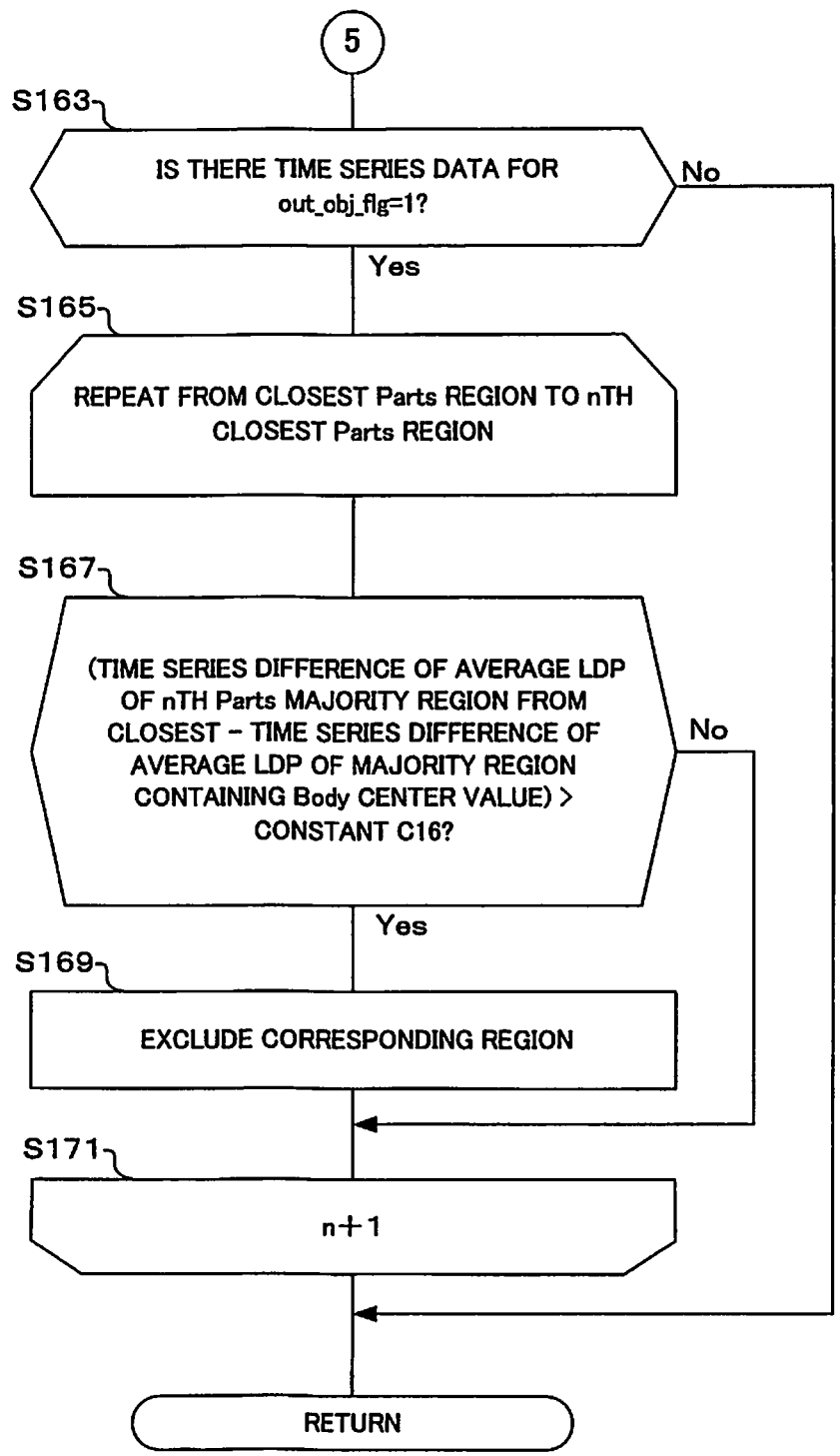

Next, operation for crossing exclusion 2 shown in step S41 (refer to FIG. 3) will be described using the flowcharts shown in FIG. 6A and FIG. 6B. The flow for crossing exclusion 2 checks depth information in the subject detection range and periphery of the subject detection range across a plurality of frames, and performs focus adjustment by excluding regions that contain a crossing subject the instant that the crossing subject enters into the subject detection range.

If the flow for crossing exclusion 2 shown in FIG. 6A is commenced, first, center value is calculated for AF areas of a region (body region) that is in a body range that has not been excluded up to now (S151). Crossing exclusion 2 is processing, in shooting a movie in which frames stretch continuously, and continuous still pictures (rapidly taken images), excluding AF areas that contain a crossing subject so as not to focus on the crossing subject, even if the crossing subject appears suddenly. In this step, the CPU 216 calculates center values that have been arranged in order of size of average LDP, resulting from averaging LDP of AF areas of body regions that have not been excluded inside a body range, using processing for crossing exclusion 1.

If an average LDP center value for the body region has been calculated, next, it is determined whether or not an average LDP value that is at the closest distance, among average LDP for parts regions and body regions that remain, having not been excluded, is smaller than an average LDP value that is at the closest distance among average LDP of regions within a remaining outer range (S153). Here, the CPU 216 compares closest distance of a surrounding region corresponding to a background, and closest distance of a parts range and body range.

If the result of determination in step S153 was Yes, then a flag out_obj_flg is set to 1 (S155). In this case, the surrounding region corresponding to the background is more to the close-up end than the body range and parts range. On the other hand, if the result of determination in step S153 was No, then a flag out_obj_flg is set to 0 (S157). In this case, body range and parts range are more to the close-up end than the surrounding region corresponding to the background.

Next, the flag out_obj_flg is saved as time series data (S159). The CPU 216 reads out frame images from the image sensor 208, and if the flag out_obj_flg was set in steps S155 or S157, this flag is sequentially stored in DRAM 228 (or non-volatile memory). As a result of storing the time series data for the flag, it is possible to read out flag setting value for the current frame, flag setting value for one frame before, flag setting value for two frames before, . . . .

If the flag has been saved as time series data, next LDP time series difference is calculated (S161). A time series difference Dc of average LDP representing the closest among average LDPs of parts regions is defined as follows. Regarding difference Dc, average LDP of a region showing the closest region, among average LDPs of remaining parts regions in a current frame, is made Lp. Then, average LDP of region showing the closest region, among average LDPs of remaining parts regions that have not been subjected to crossing exclusion, being data for three frames before, is made L3. It is then possible to calculate the difference Dc using equation (3) below.

$$Dc = Lp - L3 \tag{3}$$

Also, if equation (3) is further extrapolated, a difference Dcn of average LDPs of regions showing the nth closest distance from the closest, among average LDPs of parts regions, becomes as described below. Regarding difference Dcn, average LDP showing the nth closest region from the closest, among average LDPs of remaining parts regions in a current frame, is made Lpn. Then, average LDP of regions showing the nth closest from the closest, among average LDPs of remaining parts regions that have not been subjected to crossing exclusion, being data for three frames before, is made L3n. It is then possible to calculate the difference Dcn using equation (4) below.

$$Dcn = Lpn - L3n \quad (4)$$

Also, difference Dm of average values of regions that contain a center value, among body regions, is defined as described below. If average LDP of regions containing a center value, among body regions remaining in the current frame, is made Lm, and average LDP of regions containing a center value among body region that have not been subjected to crossing exclusion, being data of three frames before, is made L3m, difference Dm can be calculated using equation (5) below.

$$Dm = Lm - Lm3 \quad (5)$$

It should be noted that in equations (3) to (5) described above a difference in average LDP has been calculated for the current frame and three frames before, but this is not limiting, and may be a difference between the current frame and one frame before, two frames before, and four or more frames before. In any event, it is preferable to calculate difference in average LDP that satisfies specified conditions.

If time series difference of average LDP has been calculated, it is next determined whether or not there is time series data for out_obj_flg=1 (S163). As was described previously, out_obj_flg=1 is a case where a surrounding region corresponding to a background is more to the close-up end than a body range and a parts range. In this case it is possible that a crossing subject has entered to the inside of the screen. Since the out_obj_flg was saved in step S159, the CPU 216 reads out the saved results and determines whether data for out_obj_flg=1 exists for a specified number of previous frames. If the result of this determination is that there is no time series data for out_obj_flg=1, this flow is terminated.

If the result of determination in step S163 is that there is time series data for out_obj_flg=1, then in steps S165 to S171 there is repeating processing from a parts region corresponding to the closest range to a parts region corresponding to the nth closest distance from the closest range (S165).

First, it is determined whether or not (time series difference Dcn of average LDP for parts region corresponding to the nth closest distance from the closest range−time series difference Dm of average LDP of regions containing a center value, among body regions)>constant C16 (S167). Here, the CPU 216 determines whether or not a difference value between this time series difference Dcn, and time series difference Dm of average LDP of body regions containing a center value, is larger than constant C16, using the time series difference Dcn for parts regions that was calculated in step S161.

Figure 11:
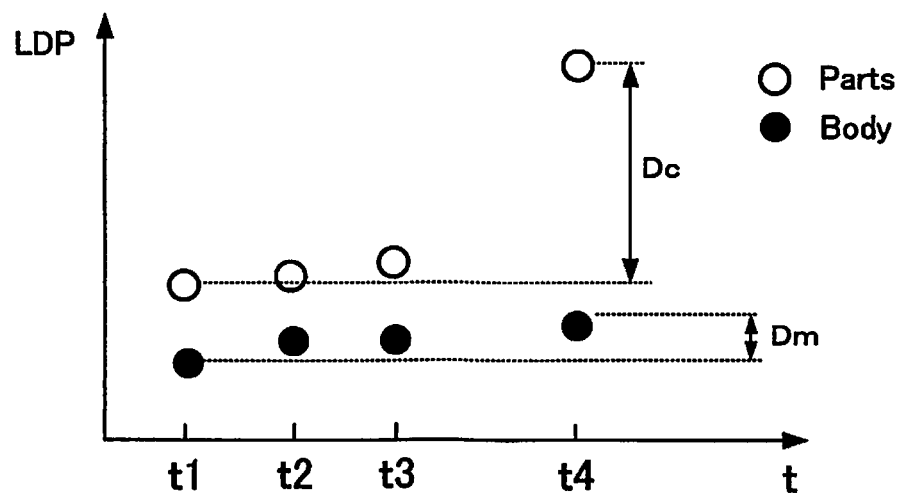
FIG. 11 is a graph showing chronological change of distance for a subject of a body range and a subject of a parts range, in the imaging device of one embodiment of the present invention.

The calculation result of step S167 is a difference between average distance of a subject that is being tracked (average LDP of regions containing a center value, among body regions) and distance of parts regions that are the nth closest distance in the parts range (average LDP). If this difference value is larger than a specified value, it can be said that a crossing subject has appeared in the parts range suddenly. FIG. 11 shows time change of each distance (expressed as LDP) of a parts region representing the closest range, and a body region containing a center value, in a case where a crossing subject appears. With the example shown in FIG. 11, from time t1 to time t3 an amount of change of each distance, for a parts region showing the closest range and a body region including a center value, is substantially constant. However, at time t4 only the distance of the parts region showing the closest range changes significantly, towards the close-up end, and a time series difference Dc from time t1 to time t4 changes significantly. As a result of this it is determined that the differences Dc and Dm are larger than constant C16. In this case it can be said that a crossing subject appears in a parts range. If the result of determination in step S167 is No, processing advances to step S171.

On the other hand, if the result of determination in step S167 is Yes, the corresponding region is excluded (S169). Here, since a crossing subject has appeared in the parts range the CPU 216 excludes the corresponding region from targets for which focus adjustment will be performed.

If the corresponding region has been excluded in step S169, one is added to n that represents the order from the closest range in the parts region (S171). In steps S165 to S171, processing for steps S167 and S169 is executed in the parts regions in order from the closest range. If n, that represents the order, reaches the final region, the flow for crossing exclusion 2 is terminated, and the originating flow is returned to. It should be noted that instead of the center value of step S151, an average value that has been derived by averaging average LDP for body regions that are contained in the body range and have not been excluded, may also be adopted. Constant C16 may be changed in accordance with various conditions, such as, for example, subject type (person, bird, vehicle, etc.), focal length, focus position, subject (parts, body) size, ranging reliability of AF area of the region of interest, movement speed of the subject etc. In the description above a range where the parts range and the body range overlap has been dealt with as a parts range, but it may also be dealt with as a body range. For example, processing may be performed with only a range where the parts range PA and body range BO overlap, within the parts range PA shown in FIG. 10B, treated as a parts range.

In this way, with one embodiment of the present invention, specifically, first information on physical object detection range is acquired from the tracking block (refer, for example, to S7 in FIG. 2). Then defocus amount is detected in a plurality of AF areas (refer to S13 in FIG. 2, for example), defocus amounts of respective region of a body range, parts range, and outer range are converted to lens position LDP corresponding to distance, and a depth map is created (refer, for example, to S15 in FIG. 1 and S31 in FIG. 3). Using this depth map, regions that are largely at the background side, in a subject detection range and at a peripheral range, are determined, and excluded (refer to S35 in FIG. 3, for example). Depth information for the subject detection range and the peripheral range are compared, and regions that straddle an outer range, inside a body range and inside a parts range are specified and excluded (refer, for example, to S39 in FIG. 3, and to FIG. 6A and FIG. 5B). Depth information for the subject detection range and the range periphery is checked over a plurality of frames, and at the instant a crossing subject enters into the detection range it is excluded (refer, for example, to S41 in FIG. 3, and to FIG. 6A and FIG. 6B).

Figure 12:
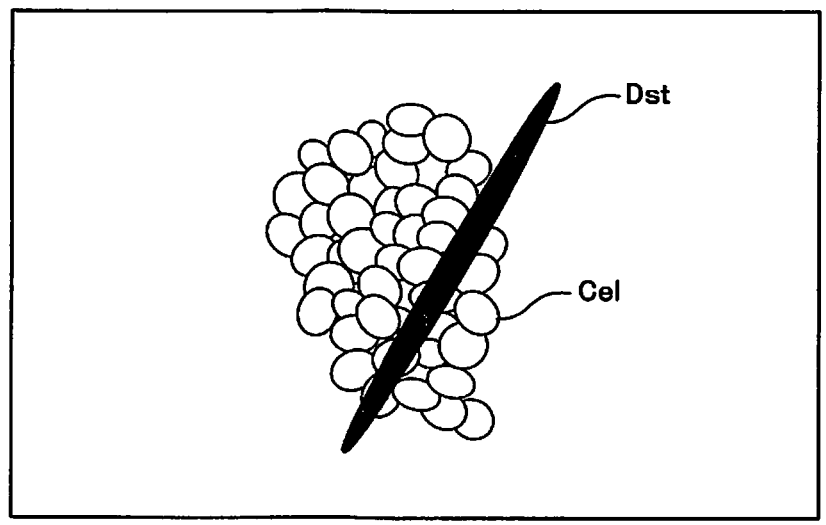
FIG. 12 is a drawing showing one example of an image constituting a target of focus adjustment, in another embodiment of the present invention.

Description has been given above of an example where the present invention has been applied to the imaging device 1. However, the present invention is not limited to being applied to an imaging device and it is possible to apply to various devices. For example, FIG. 12 shows a case where the present invention has been applied to a scientific instrument such as a microscope. Specifically, FIG. 12 shows an observation image when observing myocardial cells that have been cultivated in a culture solution using a microscope, and within the observation image there are cells Cel, and a contaminant Dst is floating in front of these cells Cel.

In a case where a microscope device is provided with an imaging section, focus detection section, and focus adjustment section, it is possible to automatically focus on cells Cel that are floating at the time of observation of a cell culture. In this state, in a case where a contaminant Dst is floating in front of the cells Cel, with a conventional focus adjustment method focus adjustment (AF) would be performed on the contaminant Dst, and the cells Cel would be blurred.

Therefore, similarly to the one embodiment of the present invention, the contaminant Dst is excluded from targets for focus adjustment, and focus adjustment may be performed for an optical system of the microscope. With the example of FIG. 12, the cells Cel that have been cultivated within the culture solution correspond to the "bird" of the one embodiment of the present invention, and the contaminant Dst that is floating in front of the cells Cel corresponds to the "branch" in front of the "Bird". By executing a flow that is similar FIG. 2 to FIG. 6B for the image data that has been acquired by the imaging section of the microscope, it is possible to focus on the cells Cel. A tracking circuit may be provided, configured so as to be capable of tracking image portions of cells within an image, the whole (body) and specified portions (parts) of cells Cel are detected, and cells Cel should be detected as the main physical object.

Figure 13:
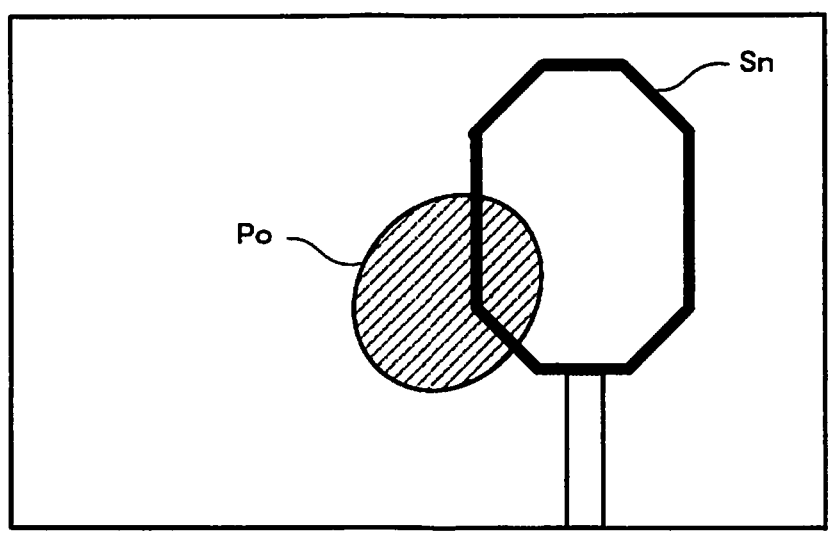
FIG. 13 is a drawing showing one example of an image constituting a target of focus adjustment, in another embodiment of the present invention.

Also, the present invention is not limited to a scientific instrument such as a microscope, and it is possible to apply the present invention to a medical appliance such as an endoscope. FIG. 13 shows appearance of inserting an endoscope into a body in order to excise a polyp Po, which is a lesioned part, with a snare Sn being brought close from above the polyp Po. In a case where the endoscope is provided with an imaging section, focus detection section and focus adjustment section, there is focus on the polyp Po, but if part of the snare Sn enters in front of the polyp the snare Sn will be focused on and the polyp Po, which is the lesioned part, will be blurred.

Therefore, similarly to the one embodiment of the present invention, the snare Sn is excluded from targets for focus adjustment, and focus adjustment may be performed for an optical system of the endoscope. With the example shown in FIG. 13, the polyp P, which is a lesioned part, corresponds to the "bird" of the one embodiment of the present invention, and the snare Sn for excising the polyp Po corresponds to the "branch" that is in front of the bird. By executing a flow that is similar FIG. 2 to FIG. 6B for the image data that has been acquired by the imaging section of the endoscope, it is possible to focus on the polyp Po. Also, a tracking circuit may be provided, configured so as to be capable of tracking image portions of the polyp within an image, the whole (body) and specified portions (parts) of polyp Po are detected, and the polyp Po should be detected as the main physical object. It should be noted that focus adjustment is not only continuously changing focal position, and also includes selective positional control to a plurality of discrete focal positions. Focus adjustment also includes cases where focal positions of two focal points are switched, such as a general endoscope.

As has been described above, the one embodiment and application examples of the present invention are a focus adjustment method for a focus adjustment device that has an image sensor that subjects light from a physical object that passes through a photographing optical system to photoelectric conversion and outputs an image signal, and performs focus adjustment based on the image signal. This focus adjustment method detects position of a main physical object based on the image signal (refer, for example, to S7 in FIG. 2), detects a distance value corresponding to subject distance of a plurality of AF regions based on the image signal (refer, for example, to S15 in FIG. 2), sets regions that show a subject distance of a close-range side that is greater than a specified amount, for a statistic of distance value of regions corresponding to the position of the main physical object, as unnecessary candidate regions (refer, for example, to S17 in FIG. 2 and S37 in FIG. 3), determines regions corresponding to unnecessary physical objects based on the unnecessary candidate regions, and controls focus adjustment based on the distance value corresponding to regions resulting from having excluded regions corresponding to the unnecessary physical object from main physical object regions (refer, for example, to S39 in FIG. 3). Further, first candidate regions within regions corresponding to main physical object region, and second candidate regions within regions corresponding to regions other than main physical object regions, are set, and regions corresponding to unnecessary physical objects are determined based on first distance values corresponding to the first candidate regions and second distance values corresponding to the second candidate regions (refer, for example, to S57 and S59 in FIG. 4A). As a result, it is possible to remove physical objects (obstructions) that are sufficiently fine to cross in front of the main physical object, and focus on the main physical object. It should be noted that fine physical objects, for example, long thin branches, are not limited to those that can be detected as long thin regions extending in a longitudinal direction, and there are many cases where such objects can be detected as discontinuous small regions. For this reason, in order to recognize that discontinuous small regions are the same object, it is determined whether or not those regions are at the same distance.

Also, the one embodiment and application examples of the present invention are a focus adjustment method for a focus adjustment device that has an image sensor that repeatedly images subject light that passes through a photographing optical system at a specified frame rate, and outputs an image signal, and performs focus adjustment based on the image signal. This focus adjustment method detects positions of first regions that contain the whole of a main physical object, and positions of second regions that contain parts of the main physical object, for every frame, based on the image signal (refer, for example, to S7 in FIG. 2), detects distance values in accordance with subject distance of a plurality of AF region based on the image signal (refer, for example, to S15 in FIG. 2), sets regions that exhibit a closer distance than a distance value representing a closest distance, among distance values a corresponding to first regions and second regions, in regions other than the first regions and the second regions, to unnecessary candidate regions (refer, for example, to S153 and S155 in FIG. 6A), determines the regions corresponding to the unnecessary physical object based on the unnecessary candidate regions, and controls focus adjustment based on distance values corresponding to regions resulting from having excluded regions corresponding to the unnecessary physical object from the second regions (refer, for example, to S169 in FIG. 6B, and S17 to S23 in FIG. 2). Further, unnecessary candidate regions are set across a plurality of frames, and it is determined that portions within second regions, that have a difference, between a difference in distance values corresponding to a first region of the newest frame and distance values corresponding to a first region of the previous frame, and a difference between distance values corresponding to a second region of the newest frame and distance values corresponding to second region of the previous frame, that is larger than a fifth specified amount, are regions corresponding to unnecessary physical objects (refer, for example, to S167 in FIG. 6B). As a result, it is possible to remove physical objects (obstructions) that are sufficiently fine to cross in front of the main physical object, and focus of the main physical object. In particular, it is possible to exclude a physical object that is sufficiently small to cross the main subject, the instant that it enters a detection range.

It should be noted that with the one embodiment of the present invention the tracking circuit 234 is provided, and the subject is tracked, but tracking is not absolutely necessary, as long as the main physical object can be detected. Also, although the tracking circuit 234 detects body and parts, it is not absolutely necessary to detect body and parts, as long as it is possible to detect a main subject and objects other than the main subject. Also, although the tracking circuit 234 detects a particular object, AI is not absolutely necessary as long as a main subject can be detected. Also, while the imaging device 1 can provide both still picture shooting and movie shooting, it is also possible to provide only one or the other. Also, although both crossing exclusion 1 and crossing exclusion 2 have been performed, it is possible to perform only crossing exclusion 1.

It should be noted that with the one embodiment of the present invention, some or all of the image processing section 218, image compression and expansion section 220, focus detection circuit 222, tracking circuit 234 etc. may be integrated with the CPU 216 and the peripheral circuitry of the CPU. It is also possible for the image processing section 218, image compression and expansion section 220, focus detection circuit 222, tracking circuit 234 etc. to have a hardware structure such as gate circuits that have been generated based on a programming language that is described using Verilog, and also to use a hardware structure that utilizes software such as a DSP (digital signal processor), and also to be respective circuit sections of a processor made up of integrated circuits such as an FPGA (Field Programmable Gate Array). These approaches may also be suitably combined. Alternatively, a processor that is constructed with one or more CPUs may execute functions of each section, by reading out and executing computer programs that have been stored in a storage medium.

Also, with the one embodiment of the present invention, a device for taking pictures has been described using a digital camera, but as a camera it is also possible to use a digital single lens reflex camera, a mirror less camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. In any event, it is possible to apply the present invention to any device that acquires images using an imaging section, and performs focus adjustment.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, having an image sensor that subjects light from a physical object that has passed through an optical system to photoelectric conversion and outputs an image signal, and that performs focus adjustment based on the image signal, comprising:
   a main physical object position detection circuit for detecting position of a main physical object based on the image signal;
   a distance value detection circuit for detecting distance values corresponding to object distance for a plurality of AF regions based on the image signal; and
   a processor having a candidate region setting section for setting regions exhibiting a distance value for a close-range side of greater than a specific value, with respect to a statistical value for distance values of regions corresponding to position of the main physical object, to unnecessary candidate regions, and a control section for determining regions corresponding to unnecessary physical objects based on the unnecessary candidate regions, and controlling focus adjustment based on distance values corresponding to regions that have had regions corresponding to the unnecessary physical objects excluded from the main physical object regions,
   wherein
   the candidate region setting section sets first candidate regions within regions corresponding to the main physical object region, and second candidate regions within regions corresponding to regions other than the main physical object region, and
   the control section determines regions corresponding to the unnecessary physical objects based on first distance values corresponding to the first candidate regions, and second distance values corresponding to the second candidate regions.

2. The focus adjustment device of claim 1, wherein:
the control section determines the first candidate regions and the second candidate regions to be regions corresponding to the unnecessary physical objects, in the event that a difference between the first distance values and the second distance values is within a first specified range, and a ratio of area of the first candidate regions to area of the main physical object region is smaller than a second specified value.

3. The focus adjustment device of claim 1, wherein:
the main physical object position detection circuit detects position of a first region that contains the entirety of a main physical object, and positions of second regions that contain parts of the main physical object;
the candidate region setting section sets third candidate regions within the second regions, and
the control section determines regions corresponding to the unnecessary physical objects based on the first distance values, the second distance values, and third distance values corresponding to the third candidate regions.

4. The focus adjustment device of claim 3, wherein:
the control section determines the first candidate regions, the second candidate regions, and the third candidate regions to be regions corresponding to unnecessary physical objects when differences between the first distance values, the second distance values, and the third distance values are within a range of a third specified amount.

5. The focus adjustment device of claim 4, wherein:
the control section further determines the first candidate regions, the second candidate regions, and the third candidate regions to be regions corresponding to the unnecessary physical objects, in the event that a ratio of area of the third candidate regions to area of the second region is smaller than a fourth specified amount.

6. The focus adjustment device of claim 1, wherein:
the image sensor repeatedly images object light that has passed though the optical system at a specified frame rate, to output the image signal;
the main physical object position detection circuit detects position of a first region that contains the entirety of a main physical object, and positions of second regions that contain parts of the main physical object, for every frame, based on the image signal;
the distance value detection circuit detects distance values in accordance with object distance of a plurality of AF regions for every frame, based on the image signal;
the candidate region setting section sets regions that exhibit a closer distance than a distance value representing the closest distance, among distance values corresponding to the first region and the second region, in regions other than the first region and the second region, to unnecessary candidate regions; and
the control section determines regions corresponding to unnecessary physical objects based on the unnecessary candidate regions, and controls focus adjustment based on distance value corresponding to regions resulting from having excluded regions corresponding to the unnecessary physical object from the second regions, wherein
in the event that unnecessary candidate regions are set across a plurality of frames, the control section determines that portions within second regions, that have a difference, between a difference in distance values corresponding to a first region of the newest frame and distance values corresponding to a first region of the previous frame, and a difference between distance values corresponding to a second region of the newest frame and distance values corresponding to second region of the previous frame, that is larger than a fifth specified amount, are regions corresponding to unnecessary physical objects.

7. The focus adjustment device of claim 1, wherein:
the unnecessary candidate regions are made up of a plurality of AF regions.

8. A focus adjustment method, for a focus adjustment device, having an image sensor that subjects light from a physical object that has passed through an optical system to photoelectric conversion and outputs an image signal, and that performs focus adjustment based on the image signal, comprising:
detecting position of a main physical object based on the imaging signal;
detecting distance values corresponding to object distance for a plurality of AF regions based on the image signal;
setting regions exhibiting a distance value for a close-range side of greater than or equal to a specified amount, with respect to a statistical value of the distance values of regions corresponding to position of the main physical object, to unnecessary candidate regions;
determining regions corresponding to unnecessary physical objects based on the unnecessary candidate regions, and controlling focus adjustment based on distance value corresponding to regions resulting from having excluded regions corresponding to the unnecessary physical object from the main physical object region;
further, setting first candidate regions within regions corresponding to the main physical object region, and second candidate regions within regions corresponding to regions other than the main physical object region; and
determining regions corresponding to the unnecessary physical objects based on first distance values corresponding to the first candidate regions, and second distance values corresponding to the second candidate regions.

9. The focus adjustment method of claim 8, further comprising:
determining the first candidate regions and the second candidate regions to be regions corresponding to the unnecessary physical objects, in the event that a difference between the first distance values and the second distance values is within a first specified range, and a ratio of area of the first candidate regions to area of the main physical object region is smaller than a second specified value.

10. The focus adjustment method of claim 8, further comprising:
detecting position of a first region that contains the entirety of a main physical object, and positions of second regions that contain parts of the main physical object;
setting the third candidate regions within the second region; and
determining regions corresponding to the unnecessary physical objects based on the first distance values, the second distance values, and third distance values corresponding to the third candidate regions.

11. The focus adjustment method of claim 10, further comprising:
determining the first candidate regions, second candidate regions and the third candidate regions to be regions corresponding to unnecessary physical objects when differences between the first distance values, the second distance values, and the third distance values are within a range of a third specified amount.

12. The focus adjustment method of claim 11, further comprising:
determining the first candidate regions, the second candidate regions, and the third candidate regions to be regions corresponding to the unnecessary physical objects, in the event that a ratio of area of the third candidate regions to area of the second region is smaller than a fourth specified amount.

13. The focus adjustment method of claim 8, further comprising:
repeatedly imaging object light that has passed though the optical system at a specified frame rate, to output the image signal;
detecting position of a first region that contains the entirety of a main physical object, and positions of second regions that contain parts of the main physical object, for every frame, based on the image signal;
detecting distance values in accordance with object distance of a plurality of AF regions for every frame, based on the image signal;
setting regions that exhibit a closer distance than a distance value representing the closest distance, among distance values corresponding to the first region and the second region, in regions other than the first region and the second region, to unnecessary candidate regions; and
determining regions corresponding to unnecessary physical objects based on the unnecessary candidate regions, and controlling focus adjustment based on distance value corresponding to regions resulting from having excluded regions corresponding to the unnecessary physical object from the second regions,
wherein
in the event that unnecessary candidate regions are set across a plurality of frames, portions within second regions, that have a difference, between a difference in distance values corresponding to a first region of the newest frame and distance values corresponding to a first region of the previous frame, and a difference between distance values corresponding to a second region of the newest frame and distance values corresponding to second region of the previous frame, that is larger than a fifth specified amount, are determined to be regions corresponding to unnecessary physical objects.

14. The focus adjustment method of claim 8, wherein:
the unnecessary candidate regions are made up of a plurality of AF regions.

15. A non-transitory computer-readable medium, storing a processor executable code, which when executed by at least one processor, the processor being arranged within a focus adjustment device that has an image sensor that subjects light from a physical object that has passed through an optical system to photoelectric conversion to output an image signal, and performs focus adjustment based on the image signal, performs a focus adjustment method, the focus adjustment method comprising:
detecting position of a main physical object based on the imaging signal;
detecting distance values corresponding to object distance for a plurality of AF regions based on the image signal;
setting regions exhibiting a distance value for a close-range side of greater than or equal to a specified amount, with respect to a statistical of the distance values of regions corresponding to position of the main physical object, to unnecessary candidate regions;
determining regions corresponding to unnecessary physical objects based on the unnecessary candidate regions, and controlling focus adjustment based on distance value corresponding to regions resulting from having excluded regions corresponding to the unnecessary physical object from the main physical object region;
further, setting first candidate regions within regions corresponding to the main physical object region, and second candidate regions within regions corresponding to regions other than the main physical object region; and
determining regions corresponding to the unnecessary physical objects based on first distance values corresponding to the first candidate regions, and second distance values corresponding to the second candidate regions.

16. The non-transitory computer-readable medium of claim 15, storing further processor executable code, which when executed by the at least one processor, causes the at least one processor to perform a method further comprising:
determining the first candidate regions and the second candidate regions to be regions corresponding to the unnecessary physical objects, in the event that a difference between the first distance values and the second distance values is within a first specified range, and a ratio of area of the first candidate regions to area of the main physical object region is smaller than a second specified value.

17. The non-transitory computer-readable medium of claim 15, storing further processor executable code, which when executed by the at least one processor, causes the at least one processor to perform a method further comprising:
detecting position of a first region that contains the entirety of a main physical object, and positions of second regions that contain parts of the main physical object;
setting the third candidate regions within the second region; and
determining regions corresponding to the unnecessary physical objects based on the first distance values, the second distance values, and third distance values corresponding to the third candidate regions.

18. The non-transitory computer-readable medium of claim 17, storing further processor executable code, which when executed by the at least one processor, causes the at least one processor to perform a method further comprising:
determining the first candidate regions, second candidate regions and the third candidate regions to be regions corresponding to unnecessary physical objects when differences between the first distance values, the second distance values, and the third distance values are within a range of a third specified amount.

19. The non-transitory computer-readable medium of claim 17, storing further processor executable code, which when executed by the at least one processor, causes the at least one processor to perform a method further comprising:
determining the first candidate regions, the second candidate regions, and the third candidate regions to be regions corresponding to the unnecessary physical objects, in the event that a ratio of area of the third candidate regions to area of the second region is smaller than a fourth specified amount.

20. The non-transitory computer-readable medium of claim 15, storing further processor executable code, which when executed by the at least one processor, causes the at least one processor to perform a method further comprising:

repeatedly imaging object light that has passed though the optical system at a specified frame rate, to output the image signal;

detecting position of a first region that contains the entirety of a main physical object, and positions of second regions that contain parts of the main physical object, for every frame, based on the image signal;

detecting distance values in accordance with object distance of a plurality of AF regions for every frame, based on the image signal;

setting regions that exhibit a closer distance than a distance value representing the closest distance, among distance values corresponding to the first region and the second region, in regions other than the first region and the second region, to unnecessary candidate regions; and determining regions corresponding to unnecessary physical objects based on the unnecessary candidate regions, and controlling focus adjustment based on distance value corresponding to regions resulting from having excluded regions corresponding to the unnecessary physical object from the second regions, wherein in the event that unnecessary candidate regions are set across a plurality of frames, portions within second regions, that have a difference, between a difference in distance values corresponding to a first region of the newest frame and distance values corresponding to a first region of the previous frame, and a difference between distance values corresponding to a second region of the newest frame and distance values corresponding to second region of the previous frame, that is larger than a fifth specified amount, are determined to be regions corresponding to unnecessary physical objects.

* * * * *